US012401475B2

(12) United States Patent
Ly et al.

(10) Patent No.: US 12,401,475 B2
(45) Date of Patent: *Aug. 26, 2025

(54) CROSS-SLOT CHANNEL ESTIMATION OF UPLINK REFERENCE SIGNALS

(71) Applicant: QUALCOMM INCORPORATED, San Diego, CA (US)

(72) Inventors: Hung Dinh Ly, San Diego, CA (US); Sanghoon Kim, San Jose, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/756,889

(22) Filed: Jun. 27, 2024

(65) Prior Publication Data

US 2024/0430055 A1 Dec. 26, 2024

Related U.S. Application Data

(63) Continuation of application No. 17/643,319, filed on Dec. 8, 2021, now Pat. No. 12,047,316.

(60) Provisional application No. 63/199,627, filed on Jan. 13, 2021.

(51) Int. Cl.
H04L 5/00 (2006.01)
H04W 72/0453 (2023.01)

(52) U.S. Cl.
CPC ....... H04L 5/0048 (2013.01); H04W 72/0453 (2013.01)

(58) Field of Classification Search
None
See application file for complete search history.

(56) References Cited

U.S. PATENT DOCUMENTS

| | | | |
|---|---|---|---|
| 2019/0021017 A1* | 1/2019 | Nagaraja | H04W 72/51 |
| 2019/0045345 A1 | 2/2019 | Lee et al. | |
| 2020/0236716 A1* | 7/2020 | Lei | H04W 74/0833 |
| 2020/0329523 A1 | 10/2020 | Yi et al. | |
| 2021/0298046 A1 | 9/2021 | Li et al. | |
| 2022/0053289 A1* | 2/2022 | Liu | G01S 1/0428 |
| 2022/0103324 A1* | 3/2022 | Ly | H04L 5/0048 |
| 2022/0224473 A1 | 7/2022 | Ly et al. | |
| 2023/0217493 A1* | 7/2023 | Yi | H04W 74/0866 370/329 |

(Continued)

Primary Examiner — Mewale A Ambaye
(74) Attorney, Agent, or Firm — QUALCOMM INCORPORATED

(57) ABSTRACT

Various aspects of the present disclosure generally relate to wireless communication. In some aspects, a mobile station may transmit first uplink reference signals in a first time slot. The mobile station may transmit an uplink communication with a frequency domain resource allocation different than a frequency domain resource allocation for the first uplink reference signals. The mobile station may determine a time gap between the transmitted uplink communication and second uplink reference signals to be transmitted in a second time slot and retune the mobile station during the time gap such that the second uplink reference signals maintain phase continuity with the first uplink reference signals. The mobile station may transmit the second uplink reference signals in the second time slot. The first time slot and the second time slot may be consecutive time slots for uplink reference signals. Numerous other aspects are described.

13 Claims, 18 Drawing Sheets

(56) References Cited

U.S. PATENT DOCUMENTS

| | | | |
|---|---|---|---|
| 2023/0344592 A1* | 10/2023 | Zhou | H04W 52/0235 |
| 2023/0421320 A1* | 12/2023 | Levitsky | H04W 72/23 |
| 2024/0430055 A1* | 12/2024 | Ly | H04W 72/0453 |
| 2025/0047439 A1* | 2/2025 | Ko | H04L 5/0055 |

* cited by examiner

CROSS-SLOT CHANNEL ESTIMATION OF UPLINK REFERENCE SIGNALS

CROSS-REFERENCE TO RELATED APPLICATION

This patent application is a continuation of U.S. patent application Ser. No. 17/643,319, filed on Dec. 8, 2021, entitled "CROSS-SLOT CHANNEL ESTIMATION OF UPLINK REFERENCE SIGNALS" which claims priority to U.S. Provisional Patent Application No. 63/199,627, filed on Jan. 13, 2021, entitled "CROSS-SLOT CHANNEL ESTIMATION OF UPLINK REFERENCE SIGNALS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for supporting cross-slot channel estimation of uplink reference signals.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a mobile station includes transmitting, by the mobile station, one or more first uplink reference signals in a first time slot and transmitting, by the mobile station, an uplink communication with a frequency domain resource allocation different than a frequency domain resource allocation for the one or more first uplink reference signals. The method includes determining, by the mobile station, a time gap between the transmitted uplink communication and one or more second uplink reference signals to be transmitted in a second time slot. The method includes retuning, by the mobile station, the mobile station during the time gap such that the one or more second uplink reference signals maintain phase continuity with the one or more first uplink reference signals. The method also includes transmitting, by the mobile station, the one or more second uplink reference signals in the second time slot, where the first time slot and the second time slot are consecutive time slots for uplink reference signals.

In some aspects, a method of wireless communication performed by a base station includes receiving, by the base station from a mobile station, an indication of a mobile station capability on a supported number of symbols in a time gap for retuning to maintain phase continuity of uplink reference signals after transmitting a communication with a different frequency domain resource allocation. The method includes transmitting, from the base station to the mobile station, an indication of a duration of the time gap for the retuning. The method also includes receiving, by the base station, one or more first uplink reference signals in a first time slot, an uplink communication, and, after the time gap, one or more second uplink reference signals in a second time slot. The first time slot and the second time slot may be consecutive time slots for uplink reference signals.

In some aspects, a method of wireless communication performed by a mobile station includes transmitting, by the mobile station, one or more first uplink reference signals in a first time slot and transmitting, by the mobile station, an uplink communication. The method includes transmitting, by the mobile station, one or more second uplink reference signals in a second time slot, where the transmitting is independent of maintaining phase continuity between the one or more first uplink reference signals and the one or more second uplink reference signals, based at least in part on a frequency domain resource allocation of the uplink communication being different than a frequency domain resource allocation for the one or more first uplink reference signals.

In some aspects, a method of wireless communication performed by a mobile station includes transmitting, by the mobile station, one or more first uplink reference signals in a first time slot and determining, by the mobile station, to maintain, after a blank time gap during which no uplink communication is transmitted, phase continuity from the one or more first uplink reference signals to one or more second uplink reference signals to be transmitted in a second time slot, based at least in part on a result of comparing the blank time gap and a blank time gap threshold. The method also includes transmitting, by the mobile station while maintaining phase continuity with the one or more first uplink reference signals, the one or more second uplink reference signals in the second time slot.

In some aspects, a mobile station for wireless communication includes a memory and one or more processors coupled to the memory, the one or more processors configured to transmit one or more first uplink reference signals in a first time slot and transmit an uplink communication with a frequency domain resource allocation different than a frequency domain resource allocation for the one or more first uplink reference signals. The one or more processors are configured to determine a time gap between the transmitted uplink communication and one or more second uplink reference signals to be transmitted in a second time slot and to retune the mobile station during the time gap, such that the one or more second uplink reference signals maintain phase continuity with the one or more first uplink reference signals. The one or more processors are configured to transmit the one or more second uplink reference signals in the second time slot, where the first time slot and the second time slot are consecutive time slots for uplink reference signals.

In some aspects, a base station for wireless communication includes a memory and one or more processors coupled to the memory, the one or more processors configured to receive an indication of a mobile station capability on a supported number of symbols in a time gap for retuning to maintain phase continuity of uplink reference signals after transmitting a communication with a different frequency domain resource allocation. The one or more processors are configured to transmit, from the base station to the mobile station, an indication of a duration of the time gap for the retuning. The one or more processors are configured to receive one or more first uplink reference signals in a first time slot, an uplink communication, and, after the time gap, one or more second uplink reference signals in a second time slot. The first time slot and the second time slot may be consecutive time slots for uplink reference signals.

In some aspects, a mobile station for wireless communication includes a memory and one or more processors coupled to the memory, the one or more processors configured to transmit one or more first uplink reference signals in a first time slot, transmit an uplink communication, and transmit one or more second uplink reference signals in a second time slot. The transmitting may be independent of maintaining phase continuity between the one or more first uplink reference signals and the one or more second uplink reference signals, based at least in part on a frequency domain resource allocation of the uplink communication being different than a frequency domain resource allocation for the one or more first uplink reference signals.

In some aspects, a mobile station for wireless communication includes a memory and one or more processors coupled to the memory, the one or more processors configured to transmit one or more first uplink reference signals in a first time slot and determine to maintain, after a blank time gap during which no uplink communication is transmitted, phase continuity from the one or more first uplink reference signals to one or more second uplink reference signals to be transmitted in a second time slot, based at least in part on a result of comparing the blank time gap and a blank time gap threshold. The one or more processors are configured to transmit the one or more second uplink reference signals in the second time slot.

In some aspects, a non-transitory computer-readable medium storing a set of instructions for wireless communication includes one or more instructions that, when executed by one or more processors of a mobile station, cause the mobile station to transmit one or more first uplink reference signals in a first time slot, transmit an uplink communication with a frequency domain resource allocation different than a frequency domain resource allocation for the one or more first uplink reference signals, determine a time gap between the transmitted uplink communication and one or more second uplink reference signals to be transmitted in a second time slot, retune the mobile station during the time gap such that the one or more second uplink reference signals maintain phase continuity with the one or more first uplink reference signals, and transmit the one or more second uplink reference signals in the second time slot, where the first time slot and the second time slot are consecutive time slots for uplink reference signals.

In some aspects, a non-transitory computer-readable medium storing a set of instructions for wireless communication includes one or more instructions that, when executed by one or more processors of a base station, cause the base station to receive an indication of a mobile station capability on a supported number of symbols in a time gap for retuning to maintain phase continuity of uplink reference signals after transmitting a communication with a different frequency domain resource allocation, transmit, from the base station to the mobile station, an indication of a duration of the time gap for the retuning, and receive one or more first uplink reference signals in a first time slot, an uplink communication, and, after the time gap, one or more second uplink reference signals in a second time slot, where the first time slot and the second time slot are consecutive time slots for uplink reference signals.

In some aspects, a non-transitory computer-readable medium storing a set of instructions for wireless communication includes one or more instructions that, when executed by one or more processors of a mobile station, cause the mobile station to transmit one or more first uplink reference signals in a first time slot, transmit an uplink communication, and transmit one or more second uplink reference signals in a second time slot, where the transmitting is independent of maintaining phase continuity between the one or more first uplink reference signals and the one or more second uplink reference signals, based at least in part on a frequency domain resource allocation of the uplink communication being different than a frequency domain resource allocation for the one or more first uplink reference signals.

In some aspects, a non-transitory computer-readable medium storing a set of instructions for wireless communication includes one or more instructions that, when executed by one or more processors of a mobile station, cause the mobile station to transmit one or more first uplink reference signals in a first time slot, determine to maintain, after a blank time gap during which no uplink communication is transmitted, phase continuity from the one or more first uplink reference signals to one or more second uplink reference signals to be transmitted in a second time slot, based at least in part on a result of comparing the blank time gap and a blank time gap threshold, and transmit the one or more second uplink reference signals in the second time slot.

In some aspects, an apparatus for wireless communication includes means for transmitting one or more first uplink reference signals in a first time slot, means for transmitting an uplink communication with a frequency domain resource allocation different than a frequency domain resource allocation for the one or more first uplink reference signals, means for determining a time gap between the transmitted uplink communication and one or more second uplink reference signals to be transmitted in a second time slot, means for retuning the apparatus during the time gap, such that the one or more second uplink reference signals maintain phase continuity with the one or more first uplink reference signals, and means for transmitting the one or more second uplink reference signals in the second time slot, wherein the first time slot and the second time slot are consecutive time slots for uplink reference signals.

In some aspects, an apparatus for wireless communication includes means for receiving an indication of a mobile station capability on a supported number of symbols in a time gap for retuning to maintain phase continuity of uplink reference signals after transmitting a communication with a different frequency domain resource allocation, means for transmitting, from the apparatus to the mobile station, an indication of a duration of the time gap for the retuning, and means for receiving one or more first uplink reference signals in a first time slot, an uplink communication, and, after the time gap, one or more second uplink reference signals in a second time slot, where the first time slot and the second time slot are consecutive time slots for uplink reference signals.

In some aspects, an apparatus for wireless communication includes means for transmitting one or more first uplink reference signals in a first time slot, means for transmitting an uplink communication, and means for transmitting one or more second uplink reference signals in a second time slot, where the transmitting is independent of maintaining phase continuity between the one or more first uplink reference signals and the one or more second uplink reference signals, based at least in part on a frequency domain resource allocation of the uplink communication being different than a frequency domain resource allocation for the one or more first uplink reference signals.

In some aspects, an apparatus for wireless communication includes means for transmitting one or more first uplink reference signals in a first time slot, means for determining to maintain, after a blank time gap during which no uplink communication is transmitted, phase continuity from the one or more first uplink reference signals to one or more second uplink reference signals to be transmitted in a second time slot, based at least in part on a result of comparing the blank time gap and a blank time gap threshold, and means for transmitting the one or more second uplink reference signals in the second time slot.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
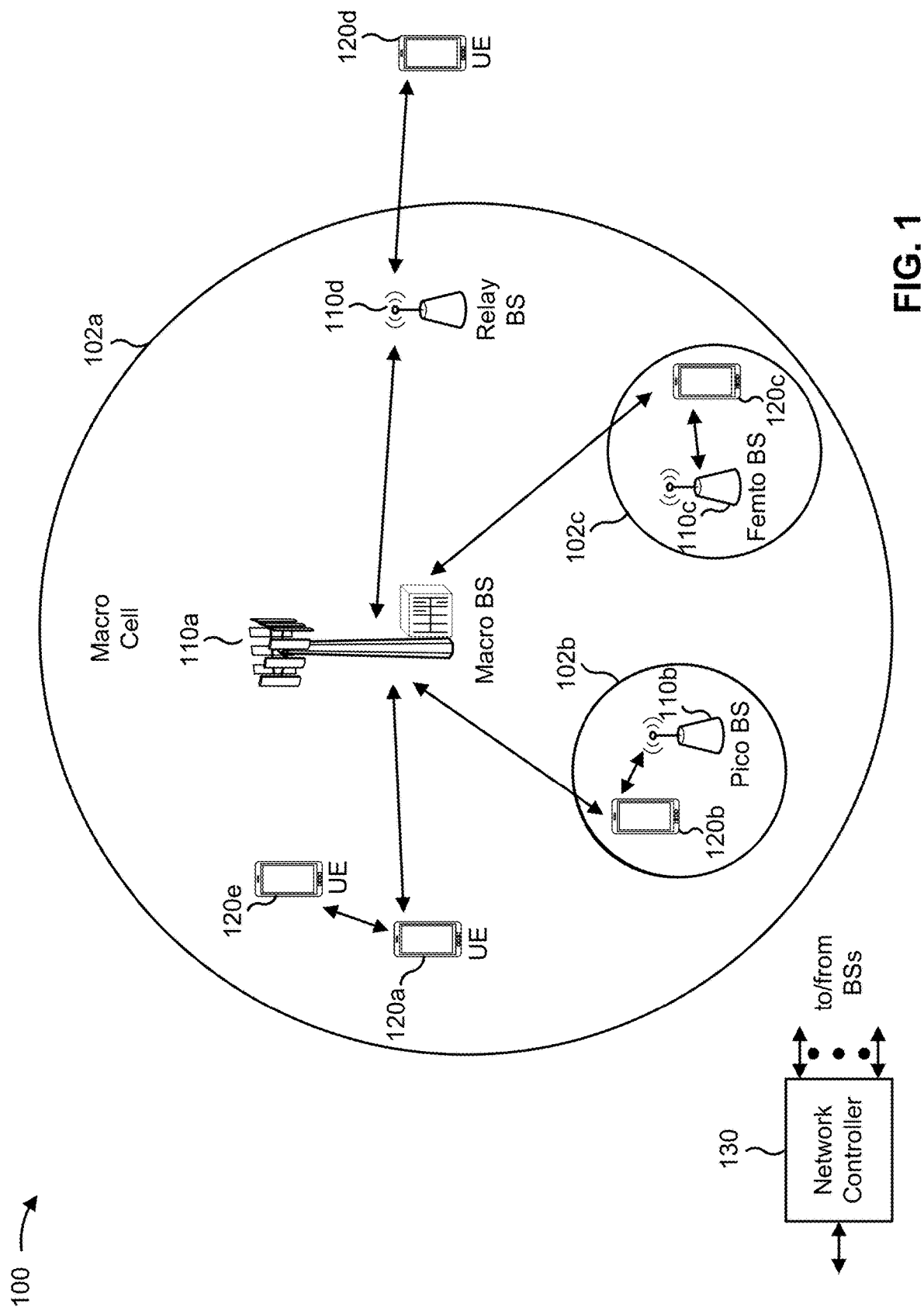
FIG. 1 is a diagram illustrating an example of a wireless network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE).

UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*c*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHZ, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHZ, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHZ). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHZ). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
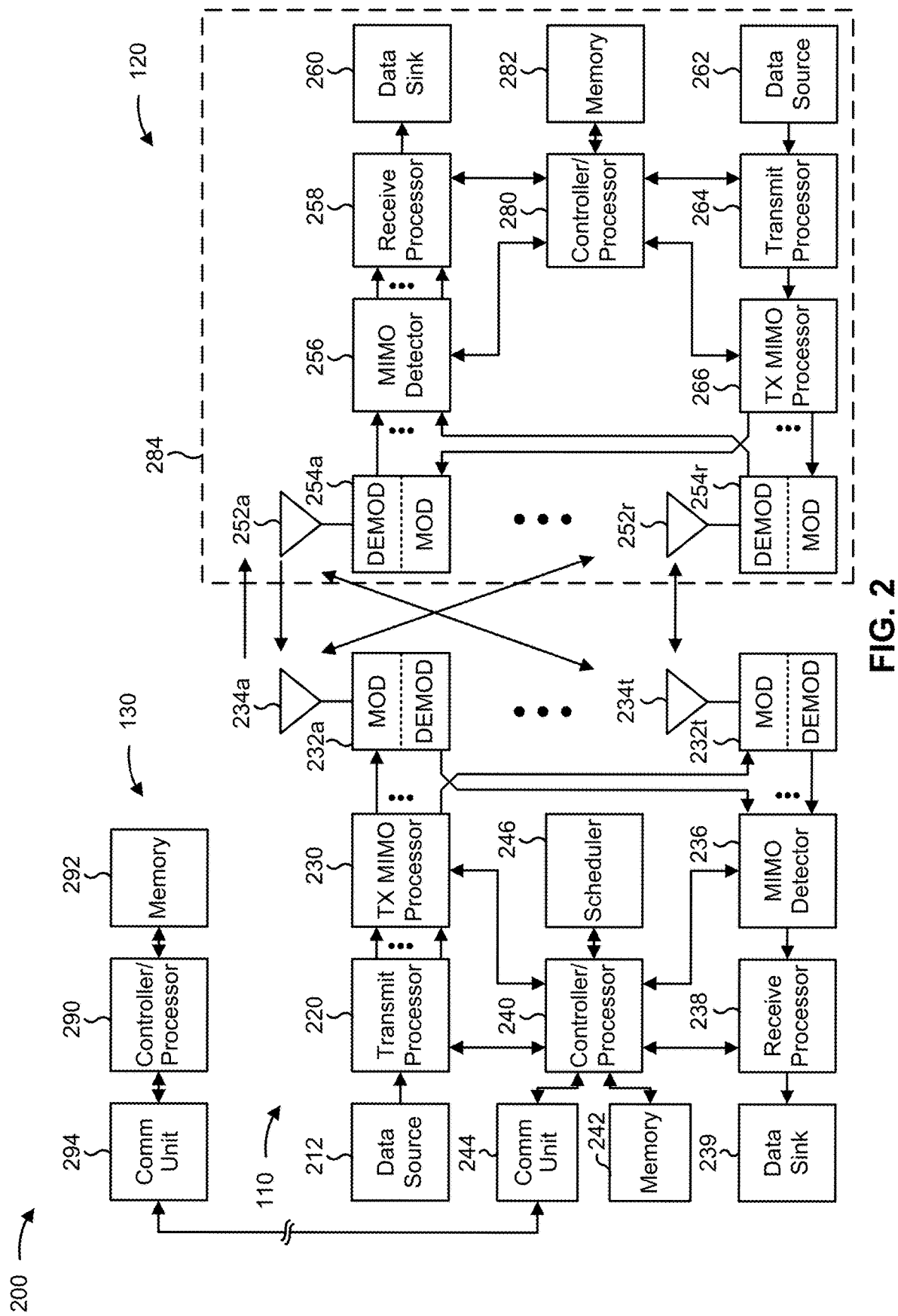
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-18).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-18).

Controller/processor 240 of base station 110, controller/processor 280 of UE 120, and/or any other component(s) of FIG. 2 may perform one or more techniques associated with supporting cross-slot channel estimation of uplink reference signals, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, process 1300 of FIG. 13, process 1400 of FIG. 14, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, and/or base station 110 to perform or direct operations of, for example, process 1100 of FIG. 11, process 1200 of FIG. 12, process 1300 of FIG. 13, process 1400 of FIG. 14, and/or other processes as described herein. In some aspects, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

In some aspects, a mobile station (e.g., UE 120) includes means for transmitting, by the mobile station, one or more first uplink reference signals in a first time slot; means for transmitting, by the mobile station, an uplink communication with a frequency domain resource allocation different than a frequency domain resource allocation for the one or more first uplink reference signals; means for determining a time gap between the transmitted uplink communication and one or more second uplink reference signals to be transmitted in a second time slot; means for retuning, by the mobile station, the mobile station during the time gap such that the one or more second uplink reference signals maintain phase continuity with the one or more first uplink reference signals; and/or means for transmitting, by the mobile station, the one or more second uplink reference signals in the second time slot, where the first time slot and the second time slot are consecutive time slots for uplink reference signals. In some aspects, the means for the mobile station to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the mobile station includes means for determining a number of symbols for a duration of the time gap from an indication in stored configuration information.

In some aspects, the mobile station includes means for determining a duration of the time gap based at least in part on a subcarrier spacing (SCS) of the one or more first uplink signals, an SCS of an active uplink bandwidth part for transmitting the one or more first uplink signals, an SCS of the uplink communication, or a fixed SCS indicated by stored configuration information.

In some aspects, the mobile station includes means for reporting a mobile station capability (e.g., UE capability) indicating a supported number of symbols in the time gap.

In some aspects, the mobile station includes means for receiving, from a base station, an indication that the mobile station is to schedule the time gap.

In some aspects, base station 110 includes means for receiving, by base station 110 from a mobile station, an indication of a mobile station capability on a supported number of symbols in a time gap for retuning to maintain phase continuity of uplink reference signals after transmitting a communication with a different frequency domain resource allocation; means for transmitting, from base station 110 to the mobile station, an indication of a duration of the time gap for the retuning; and/or means for receiving, by base station 110, one or more first uplink reference signals in a first time slot, an uplink communication, and, after the time gap, one or more second uplink reference signals in a second time slot, where the first time slot and the second time slot are consecutive time slots for uplink reference signals. The means for base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the mobile station includes means for transmitting, by the mobile station, one or more first uplink reference signals in a first time slot; means for transmitting, by the mobile station, an uplink communication; and/or means for transmitting, by the mobile station, one or more second uplink reference signals in a second time slot, where the transmitting is independent of maintaining phase continuity between the one or more first uplink reference signals and the one or more second uplink reference signals, based at least in part on a frequency domain resource allocation of the uplink communication being different than a frequency domain resource allocation for the one or more first uplink reference signals. In some aspects, the means for the mobile station to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the mobile station includes means for transmitting, by the mobile station, one or more first uplink reference signals in a first time slot; means for determining, by the mobile station, to maintain, after a blank time gap during which no uplink communication is transmitted, phase continuity from the one or more first uplink reference signals to one or more second uplink reference signals to be transmitted in a second time slot, based at least in part on a result of comparing the blank time gap and a blank time gap threshold; and/or means for transmitting, by the mobile station while maintaining phase continuity with the one or more first uplink reference signals, the one or more second uplink reference signals in the second time slot. In some aspects, the means for the mobile station to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the mobile station includes means for determining a number of symbols for a duration of the blank time gap from an indication in stored configuration information.

In some aspects, the mobile station includes means for determining a duration of the blank time gap based at least in part on an SCS of the one or more first uplink signals, an SCS of an active uplink bandwidth part for transmitting the one or more first uplink signals, or a fixed SCS indicated by stored configuration information.

In some aspects, the mobile station includes means for determining a duration of the blank time gap based at least in part on a reported mobile station capability for maintaining phase continuity between consecutive time slots of uplink reference signals across a blank time gap.

As indicated above, FIG. 2 is provided as an example. Other examples may differ from what is described with regard to FIG. 2.

Uplink channels and uplink reference signals may carry information from a UE to a base station. An uplink channel may include a physical uplink control channel (PUCCH) that carries uplink control information (UCI), a physical uplink shared channel (PUSCH) that carries uplink data, or a physical random access channel (PRACH) used for initial network access, among other examples. An uplink reference signal may include a sounding reference signal (SRS), a DMRS, or a phase tracking reference signal (PTRS), among other examples.

An SRS may carry information used for uplink channel estimation, which may be used for scheduling, link adaptation, precoder selection, or beam management, among other examples. A base station may configure one or more SRS resource sets for a UE, and the UE may transmit SRSs on the configured SRS resource sets. An SRS resource set may have a configured usage, such as uplink channel state information (CSI) acquisition, downlink CSI acquisition for reciprocity-based operations, uplink beam management, among other examples. The base station may measure the SRSs, may perform channel estimation based at least in part on the measurements, and may use the SRS measurements to configure communications with the UE.

Downlink channels and downlink reference signals may carry information from a base station to a UE. A downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. A downlink reference signal may include a synchronization signal block (SSB), a CSI reference signal (CSI-RS), a DMRS, a positioning reference signal (PRS), or a PTRS, among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. DMRSs may be used for both downlink communications and uplink communications.

Figure 3:
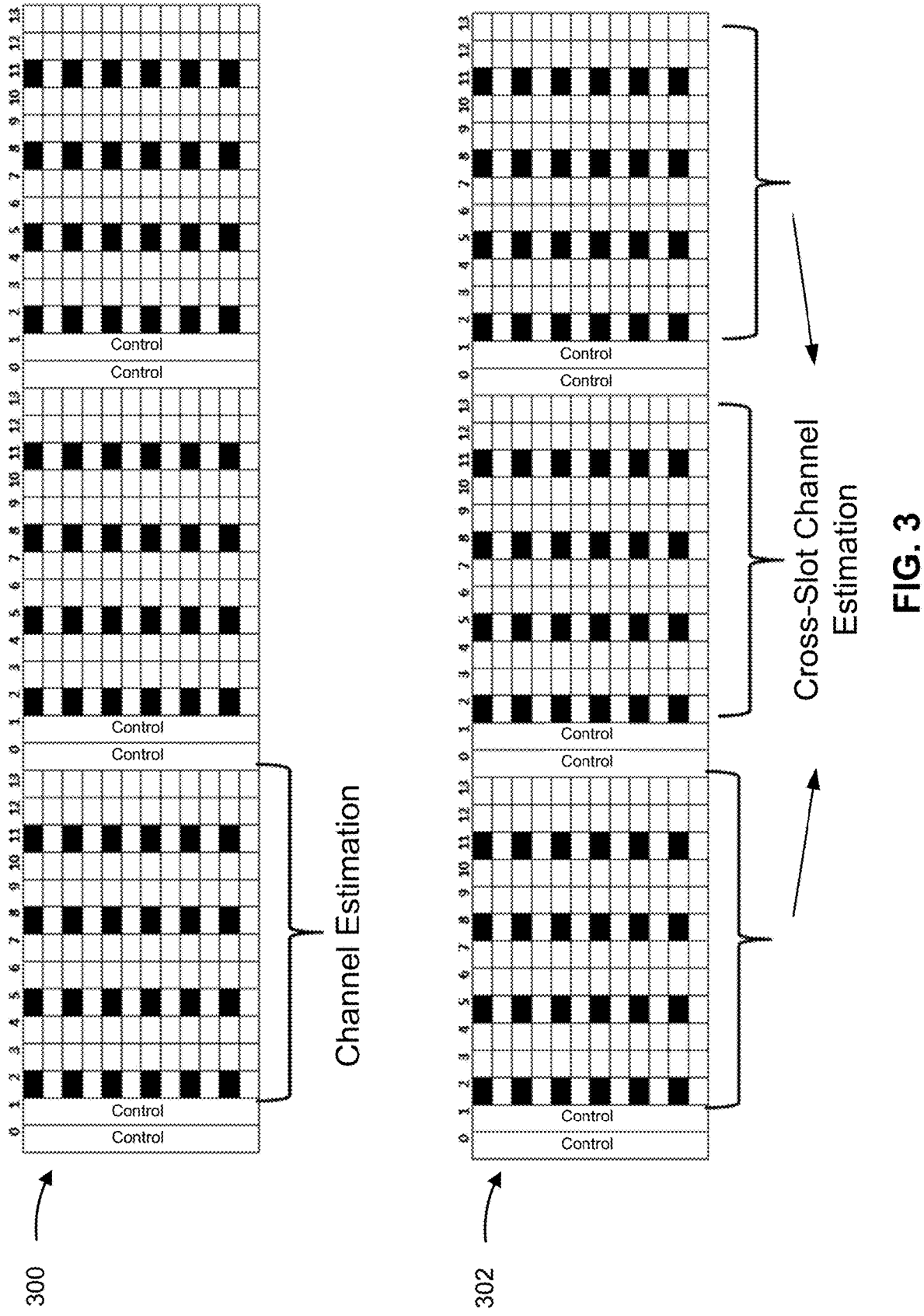
FIG. 3 is a diagram illustrating examples of channel estimation, in accordance with the present disclosure.

FIG. 3 is a diagram illustrating examples 300 and 302 of channel estimation, in accordance with the present disclosure.

Example 300 shows three slots of transport blocks. A receiving UE (or a receiving base station) may use DMRSs in each transport block for channel estimation. That is, channel estimation is performed for each slot, separately. Example 302 shows joint channel estimation, using DMRSs of the three transport blocks together. This may be referred to as "cross-slot channel estimation," "DMRS bundling," or "joint channel estimation." Cross-slot channel estimation may improve the accuracy of channel estimation, because the estimates involve information across multiple slots.

As indicated above, FIG. 3 provides some examples. Other examples may differ from what is described with regard to FIG. 3.

Figure 4:
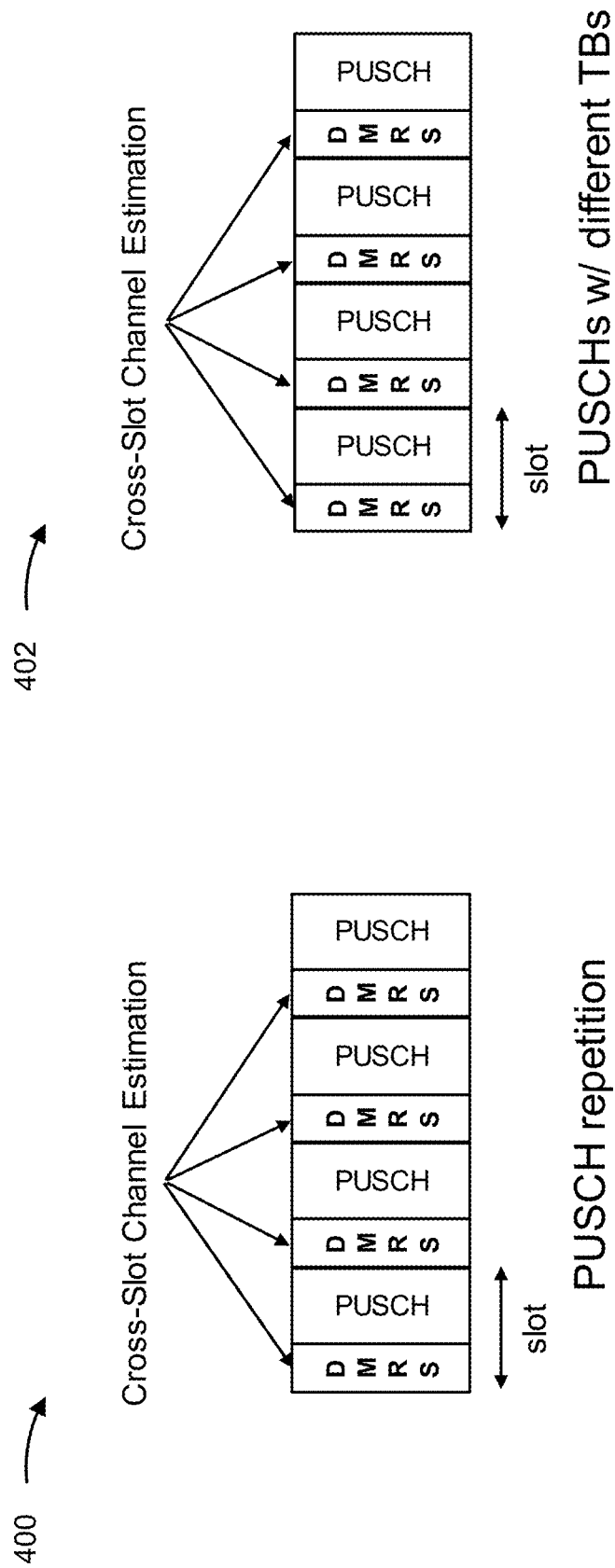
FIG. 4 is a diagram illustrating examples of consecutive slots for cross-slot channel estimation, in accordance with the present disclosure.

FIG. 4 is a diagram illustrating examples 400 and 402 of slots for cross-slot channel estimation, in accordance with the present disclosure.

In order for cross-slot channel estimation to be effective, DMRSs across the slots are to maintain phase continuity. In other words, DMRSs of the same channel estimation process are to have phase coherence from slot to slot. Phase coherence may include phase continuity in the frequency domain across consecutive slots. Signals may have a same phase if the signals have the same frequency and the maxima and minima of the signals are aligned. Signals may be phase coherent if a phase difference between the signals is the same. Maintaining phase continuity may also be referred to as "coherent transmission."

The DMRSs in examples 400 and 402 may be for consecutive slots of physical uplink channels, such as for PUSCH DMRSs or PUCCH DMRSs. Consecutive slots may be contiguous slots, such as shown by examples 400 and 402. Cross-slot channel estimation may be performed for repetitions of physical uplink channels or for repetitions of SRSs, as shown by example 400. Cross-slot channel estimation may also be performed for physical uplink channels carrying different transport blocks, as shown by example 402.

However, consecutive slots of uplink reference signals may also be non-contiguous slots, where there may be one or more slots or communications in between the consecutive slots of uplink reference signals. Non-contiguous time resource allocation or non-contiguous frequency resource allocation may cause phase discontinuity across the consecutive slots. Phase discontinuity may also be caused by other factors such as differences in transmit power and timing advances. This phase discontinuity may cause channel estimation with DMRSs to be inaccurate.

As indicated above, FIG. 4 provides some examples. Other examples may differ from what is described with regard to FIG. 4.

Figure 5:
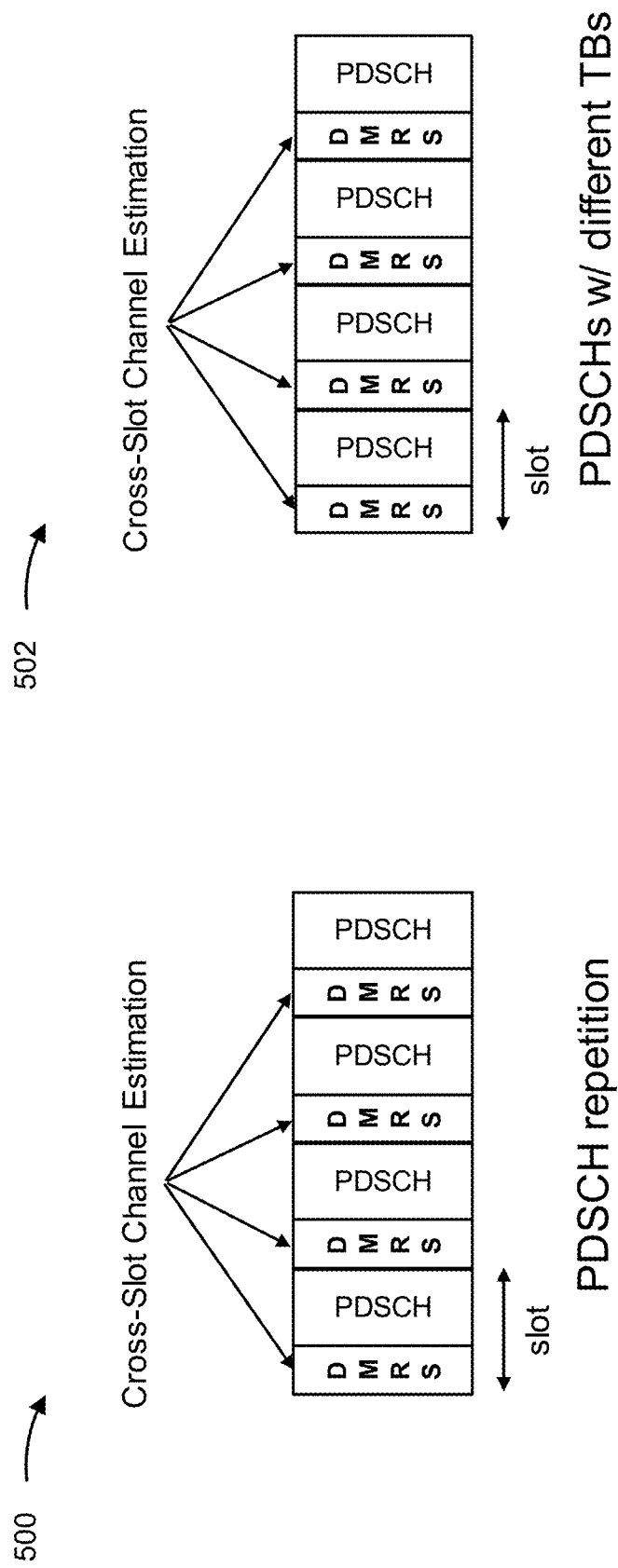
FIG. 5 is a diagram illustrating examples of consecutive slots for cross-slot channel estimation, in accordance with the present disclosure.

FIG. 5 is a diagram illustrating examples 500 and 502 of slots for cross-slot channel estimation, in accordance with the present disclosure.

While FIG. 4 shows that cross-slot channel estimation may be for physical uplink channels, FIG. 5 shows that cross-slot channel estimation may also be performed for physical downlink channels, such as for PDSCH DMRSs or PDCCH DMRSs. For example, cross-slot channel estimation may be performed for repetitions of physical downlink channels, as shown by example 500. Cross-slot channel estimation may also be performed for physical downlink channels carrying different transport blocks, as shown by example 502.

As indicated above, FIG. 5 provides some examples. Other examples may differ from what is described with regard to FIG. 5.

Figure 6:
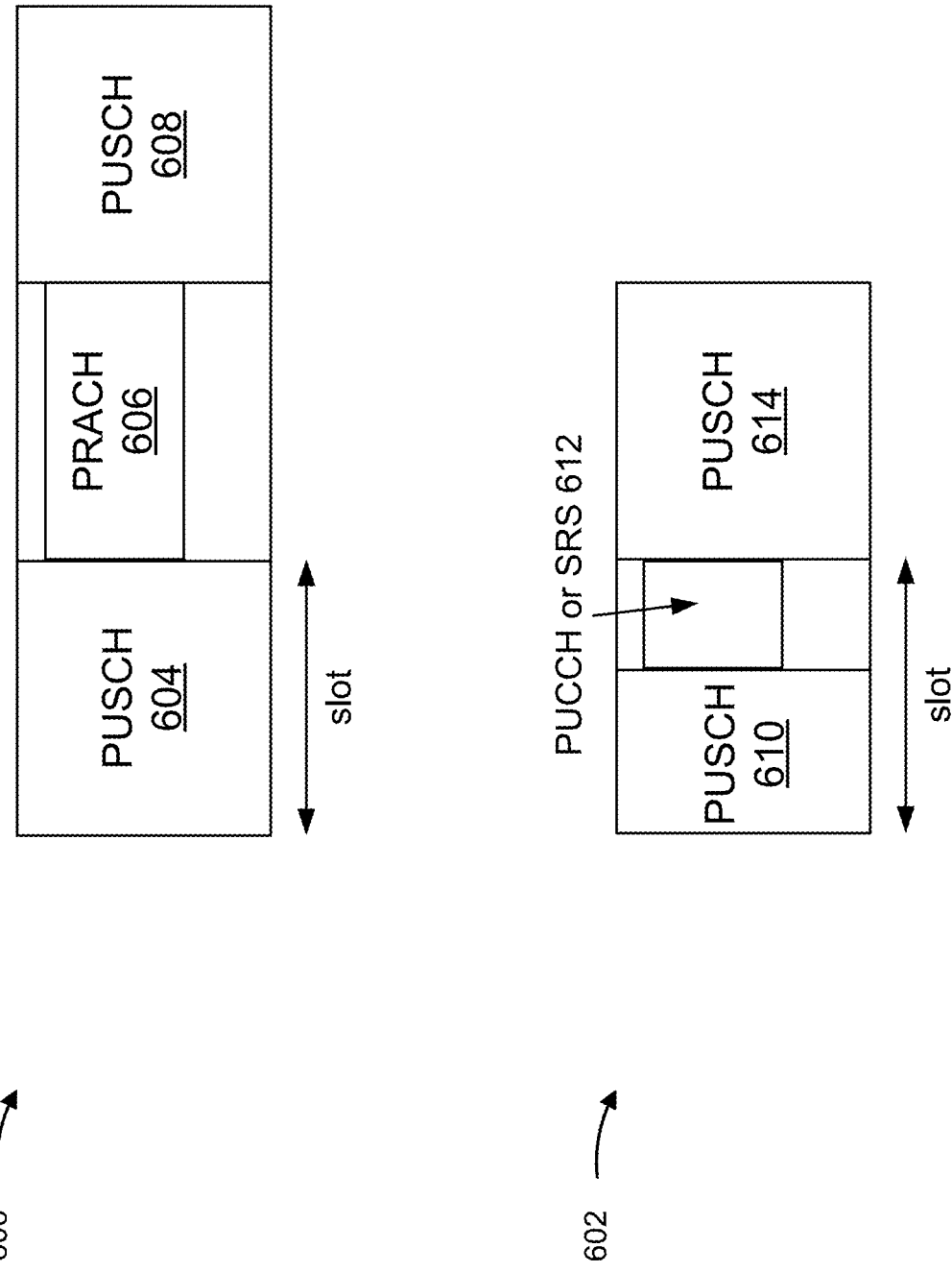
FIG. 6 is a diagram illustrating examples of an uplink communication between consecutive slots of uplink reference signals, in accordance with the present disclosure.

FIG. 6 is a diagram illustrating examples 600 and 602 of an uplink communication between consecutive slots of uplink reference signals, in accordance with the present disclosure.

Example 600 shows uplink transmission in three slots: a PUSCH 604 in a first slot, a PRACH 606 in a second slot, and PUSCH 608 in a third slot. PUSCH 604 and PUSCH 608 may have uplink reference signals, such as DMRSs. PUSCH 604 and PUSCH 608 may be consecutive slots of DMRSs that are separated by another slot for an uplink communication that has a different frequency domain resource (e.g., bandwidth) allocation. In example 600, the uplink communication between the consecutive slots of uplink reference signals is PRACH 606. The uplink communication may also be an SRS, reference signals for a different channel (e.g., PUCCH), control information, or data. Time slots of uplink reference signals may be considered to be "consecutive time slots of uplink reference signals" if the time slots are a time slot of uplink reference signals and a next time slot of the same type of uplink reference signals. There may be intervening uplink communications or downlink communications between consecutive time slots of uplink reference signals.

A UE may transmit an uplink communication between consecutive slots of uplink reference signals, and the uplink communication may cause phase discontinuity between the consecutive slots. For example, PRACH 606 between PUSCH 604 and PUSCH 608 may cause phase discontinuity across consecutive slots PUSCH 604 and PUSCH 608. If the frequency domain resource allocation (e.g., a frequency bandwidth, resource blocks (RBs), a bandwidth part (BWP)) is different for PRACH 606 than for PUSCH 604 and PUSCH 608, the UE may have to tune antennas for a different frequency band. For example, the UE, when transitioning from PUSCH 604 to PRACH 606, may tune the antennas to a different frequency band for PRACH 606. When the UE continues on to PUSCH 608, the DMRSs of PUSCH 608 may be out of phase with the DMRSs of PUSCH 604. As a result, cross-slot channel estimation for all of the DMRSs of PUSCH 604 and PUSCH 608 may be inaccurate. Inaccurate channel estimation may cause degraded communications, and the UE may waste processing resources and signaling resources due to the degraded communications.

Example 602 shows that the uplink communication may be a different physical channel or a different reference signal, and that the uplink communication may be in a same slot as uplink reference signals, such as in the first slot with PUSCH 610. The uplink communication may be transmitted before the second slot with PUSCH 614. Example 602 shows PUSCH 610 and PUCCH or SRS 612 in a first slot and PUSCH 614 in a second slot. In another example, PUCCH or SRS 612 may be in the second slot. In some examples, there may be multiple uplink communications or slots between consecutive slots of the same uplink reference signals. While consecutive PUSCH slots are shown in FIG. 6, such phase discontinuity may also be present for consecutive PUCCH slots, consecutive PDSCH slots, consecutive PDCCH slots, or consecutive SRS slots.

As indicated above, FIG. 6 provides some examples. Other examples may differ from what is described with regard to FIG. 6.

Figure 7:
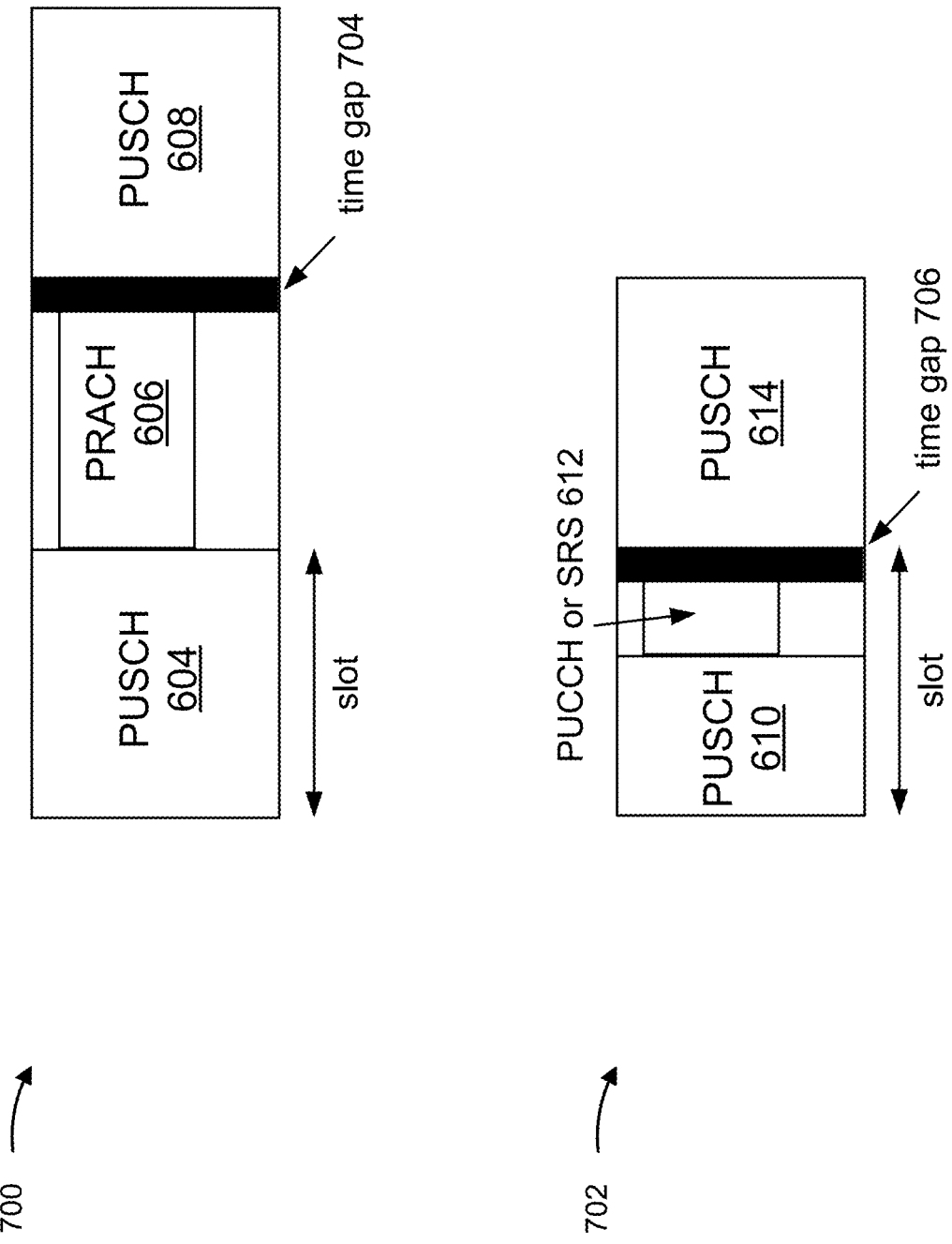
FIG. 7 is a diagram illustrating examples of supporting cross-slot channel estimation of uplink reference signals, in accordance with the present disclosure.

FIG. 7 is a diagram illustrating examples 700 and 702 of supporting cross-slot channel estimation of uplink reference signals, in accordance with the present disclosure.

According to various aspects described herein, a UE may utilize a time gap after a transmitted uplink communication to retune the UE before a next consecutive slot of uplink reference signals. The time gap may be a scheduled time gap. Example 700 shows supporting cross-slot channel estimation with a time gap 704 before a consecutive slot (e.g., PUSCH 608) after an uplink communication with a different frequency resource allocation (e.g., PRACH 606). Time gap 704 may provide an opportunity for the UE to retune antennas for PUSCH 608 so as to maintain phase continuity between the DMRSs in consecutive slots PUSCH 604 and PUSCH 608. As a result, cross-slot channel estimation may be more accurate and degraded communications may be avoided. By avoiding degraded communications, the UE and a corresponding base station may conserve processing resources and signaling resources.

Example 702 shows that a time gap 706 may also be used for retuning at an end of a slot shared by PUSCH 610 and PUCCH or SRS 612. The retuning may maintain phase continuity between DMRSs of PUSCH 610 and DMRSs of PUSCH 614.

Alternatively, time gaps 704 and 706 may also be used for retuning between consecutive PUCCH slots, consecutive PDSCH slots, consecutive PDCCH slots, or consecutive SRS slots. In fact, various aspects described herein with uplink reference signals and uplink communications may apply to downlink reference signals (e.g., PDSCH DMRSs, PDSCH PTRSs, PDCCH DMRSs, PDCCH PTRSS) and downlink communications (downlink random access messages).

As indicated above, FIG. 7 provides some examples. Other examples may differ from what is described with regard to FIG. 7.

Figure 8:
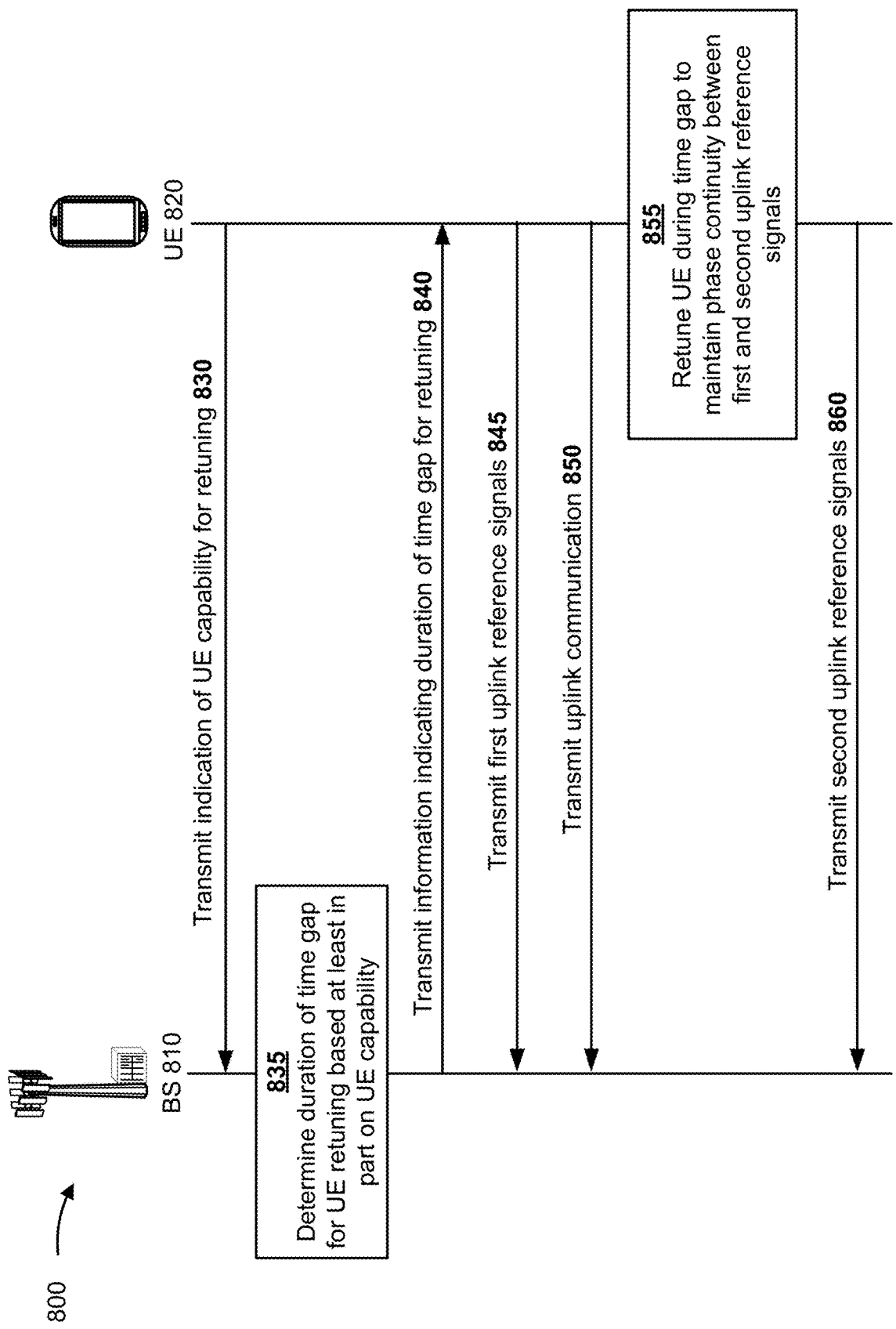
FIG. 8 is a diagram illustrating an example of supporting cross-slot channel estimation of uplink reference signals, in accordance with the present disclosure.

FIG. 8 is a diagram illustrating an example 800 of supporting cross-slot channel estimation of uplink reference signals, in accordance with the present disclosure. As shown in FIG. 8, a base station 810 (e.g., BS 110) may communicate (e.g., transmit an uplink transmission and/or receive a downlink transmission) with a mobile station, such as a UE 820 (e.g., UE 120). UE 820 and base station 810 may be part of a wireless network (e.g., wireless network 100).

As shown by reference number 830, UE 820 may transmit, and base station 810 may receive, an indication of a capability of UE 820 for retuning. The retuning may be to retune antennas to return to a particular frequency band. The indication may indicate a minimum time duration of a time gap that UE 820 may use for retuning. For example, UE 820 may have a capability to retune within 4 symbols but not within 2 symbols. UEs with better retuning capabilities may retune within 2 symbols, or even 1 symbol. An indication of 0 symbols may indicate no retuning capability for UE 820.

As shown by reference number 835, base station 810 may determine a duration of the time gap for retuning based at least in part on the indication of the UE capability for retuning. The UE capability may be a capability on a supported number of symbols in the time gap for retuning. Base station 810 may determine a time gap that satisfies a first gap threshold for a first UE capability for retuning or that satisfies a second gap threshold for a second UE capability for retuning.

As shown by reference number 840, BS 810 may transmit an indication (e.g., scheduling information) of the duration of the time gap that UE 820 is to use for retuning between consecutive slots. BS 810 may transmit the indication in system information or in a radio resource control (RRC) message. The time gap may be specified per frequency band. In some aspects, the information may indicate a number of symbols for the time gap. The number of symbols may be 0, 1, 2, or a number greater than 2. In some aspects, there may be one value (e.g., 0) for time division duplexing (TDD) and another value (e.g., 1) for frequency division duplexing (FDD). The information may indicate a starting and/or ending symbol for the time gap. In some aspects, the information indicates a time period for the time gap. Alternatively, or additionally, UE 820 may obtain the time duration of the time gap from stored configuration information (e.g., specified by a standard).

As shown by reference number 845, UE 820 may transmit first uplink reference signals in a first time slot. The uplink reference signals may be SRSs or DMRSs in a PUCCH or a PUSCH. As shown by reference number 850, UE 820 may transmit an uplink communication that has a different frequency domain resource allocation than the first uplink reference signals. The uplink communication may be different reference signals, a PRACH, control information, or data.

UE 820 may determine the time gap from an indication or from stored configuration information. As shown by reference number 855, UE 820 may retune antennas or other transceiver components to maintain phase continuity between the first uplink reference signals and the second uplink reference signals. In some aspects, a duration of the time gap for retuning may be based at least in part on an SCS (e.g., 15 kilohertz (kHz), 30 kHz, 60 kHz, or 120 kHz). A larger SCS may correspond to a larger time gap. The SCS used for the duration may be an SCS of the uplink reference signals, an SCS of an active uplink bandwidth part of the first uplink reference signals, an SCS of the uplink communication, or a fixed SCS. The fixed SCS may be indicated in the indication or the scheduling information or obtained from stored configuration information.

As shown by reference number 860, UE 820 may transmit the second uplink reference signals. By having UE 820 utilize a time gap for retuning to maintain phase continuity across the uplink reference signals of consecutive slots, base station 810 may perform cross-slot channel estimation and obtain more accurate channel estimates for the uplink reference signals than if no time gap was implemented by UE 820 for retuning.

Alternatively, in some aspects, if UE 820 is to transmit an uplink communication between consecutive slots and the uplink communication has a different frequency domain resource allocation than the consecutive slots, UE 820 may not be expected to maintain phase continuity for the consecutive slots. For example, if a frequency domain resource allocation is different by a threshold amount, UE 820 may transmit uplink reference signals in the consecutive slots without maintaining phase continuity, or independent of maintaining phase continuity across the consecutive slots. In other words, UE 820 may not retune, or utilize a time gap for retuning, before transmitting the next consecutive slot after an uplink communication with a different frequency domain resource allocation.

As indicated above, FIG. 8 is provided as an example. Other examples may differ from what is described with regard to FIG. 8.

Figure 9:
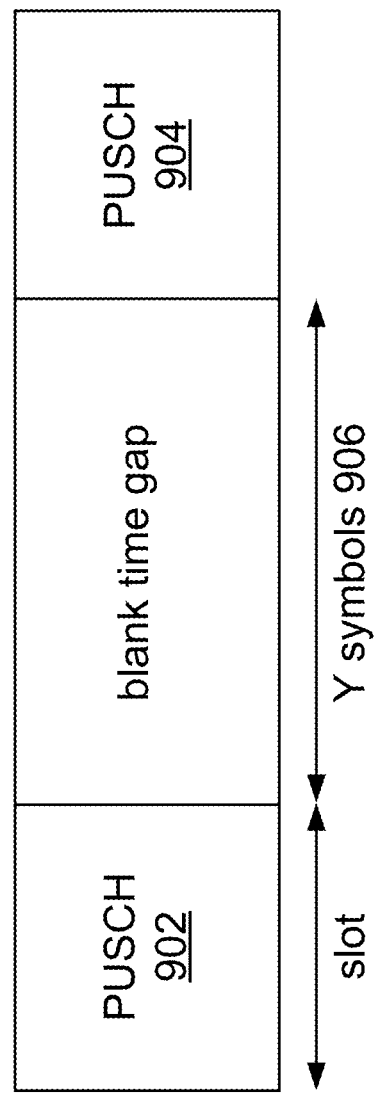
FIG. 9 is a diagram illustrating an example of maintaining phase continuity across a blank time gap, in accordance with the present disclosure.

FIG. 9 is a diagram illustrating an example 900 of maintaining phase continuity across a blank time gap, in accordance with the present disclosure.

Example 900 shows a PUSCH 902 in a first slot and PUSCH 904 in a second, consecutive slot that is separated by a blank time gap, or a time duration without an uplink communication. That is, a UE is not expected to schedule an uplink communication between consecutive time slots PUSCH 902 and PUSCH 904. The blank time gap may span a number Y of symbols 906. The UE may be configured to maintain phase continuity if the blank time gap is not too large, or if the number Y of symbols satisfies a threshold number of symbols. The UE may have difficulty maintaining phase continuity beyond such a threshold. In some aspects, number Y may be a fixed quantity, a quantity indicated in a message, or a quantity that is based at least in part on an SCS. Note that for TDD, a base station may schedule a downlink communication during the blank time gap.

As indicated above, FIG. 9 is provided as an example. Other examples may differ from what is described with regard to FIG. 9.

Figure 10:
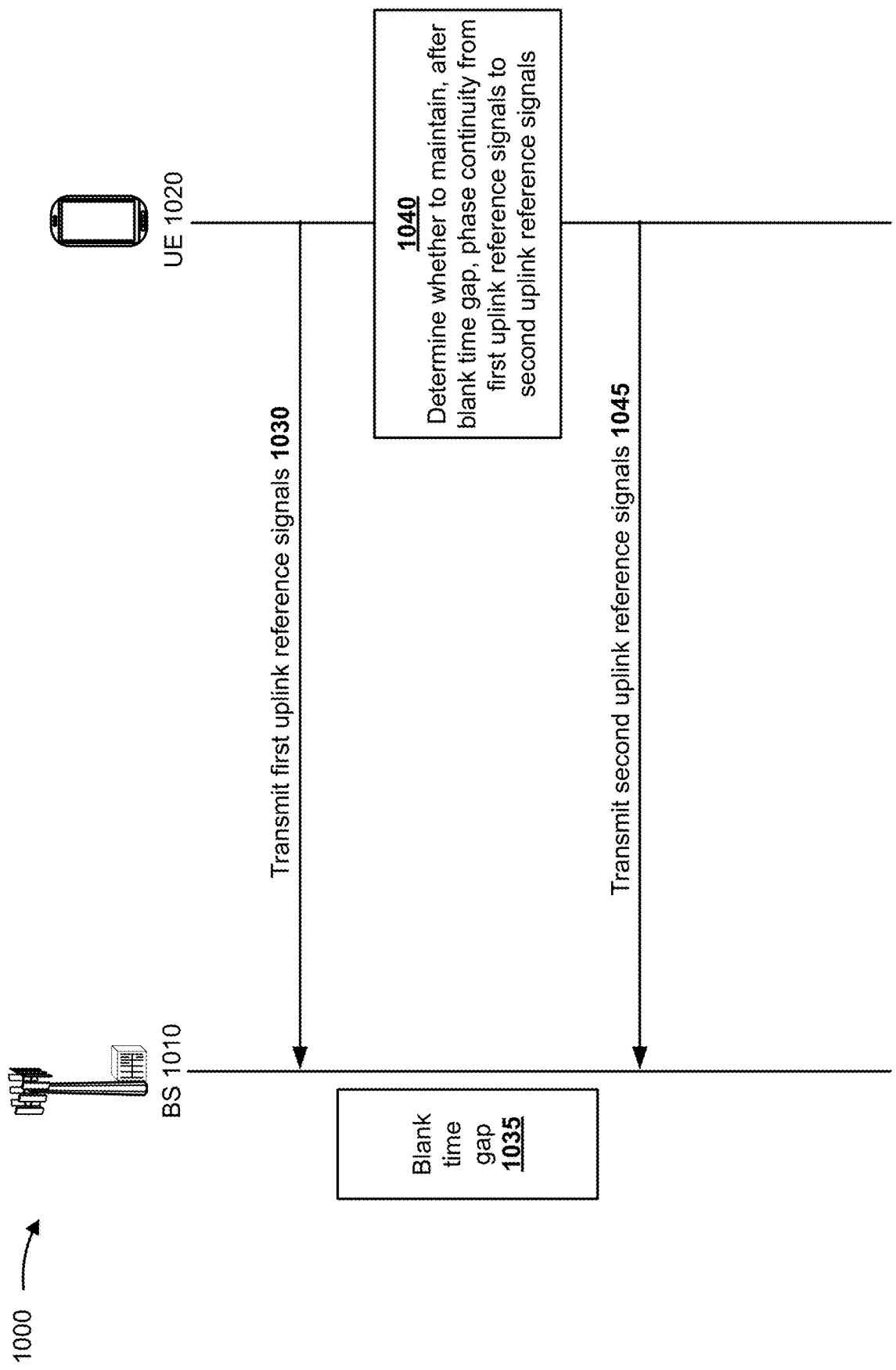
FIG. 10 is a diagram illustrating an example of maintaining phase continuity across a blank time gap, in accordance with the present disclosure.

FIG. 10 is a diagram illustrating an example 1000 of maintaining phase continuity across a blank time gap, in accordance with the present disclosure. As shown in FIG.

10, a base station 1010 (e.g., BS 110) may communicate (e.g., transmit an uplink transmission and/or receive a downlink transmission) with a UE 1020 (e.g., UE 120). UE 1020 and base station 1010 may be part of a wireless network (e.g., wireless network 100). UE 1020 may be referred to as a "mobile station."

As shown by reference number 1030, UE 1020 may transmit first uplink reference signals. As shown by reference number 1035, there may be a blank time gap after the first uplink reference signals are transmitted. During this blank time gap (or before the blank time gap), UE 1020 may determine whether to maintain, after the blank time gap, phase continuity from the first uplink reference signals to second uplink reference signals, as shown by reference number 1040. UE 1020 may retune antennas or transceiver components to maintain phase continuity based at least in part on a number Y of symbols that UE 1020 obtained or determined. For example, if the number Y satisfies a blank gap threshold, UE 1020 maintains phase continuity. If the number Y does not satisfy the blank gap threshold, UE 1020 is not expected to maintain phase continuity. As shown by reference number 1045, UE 1020 may transmit the second uplink reference signals. By flexibly determining when to maintain phase continuity across a gap between consecutive slots, UE 1020 may conserve processing and signaling resources while avoiding inaccurate cross-slot channel estimates.

As indicated above, FIG. 10 is provided as an example. Other examples may differ from what is described with regard to FIG. 10.

Figure 11:
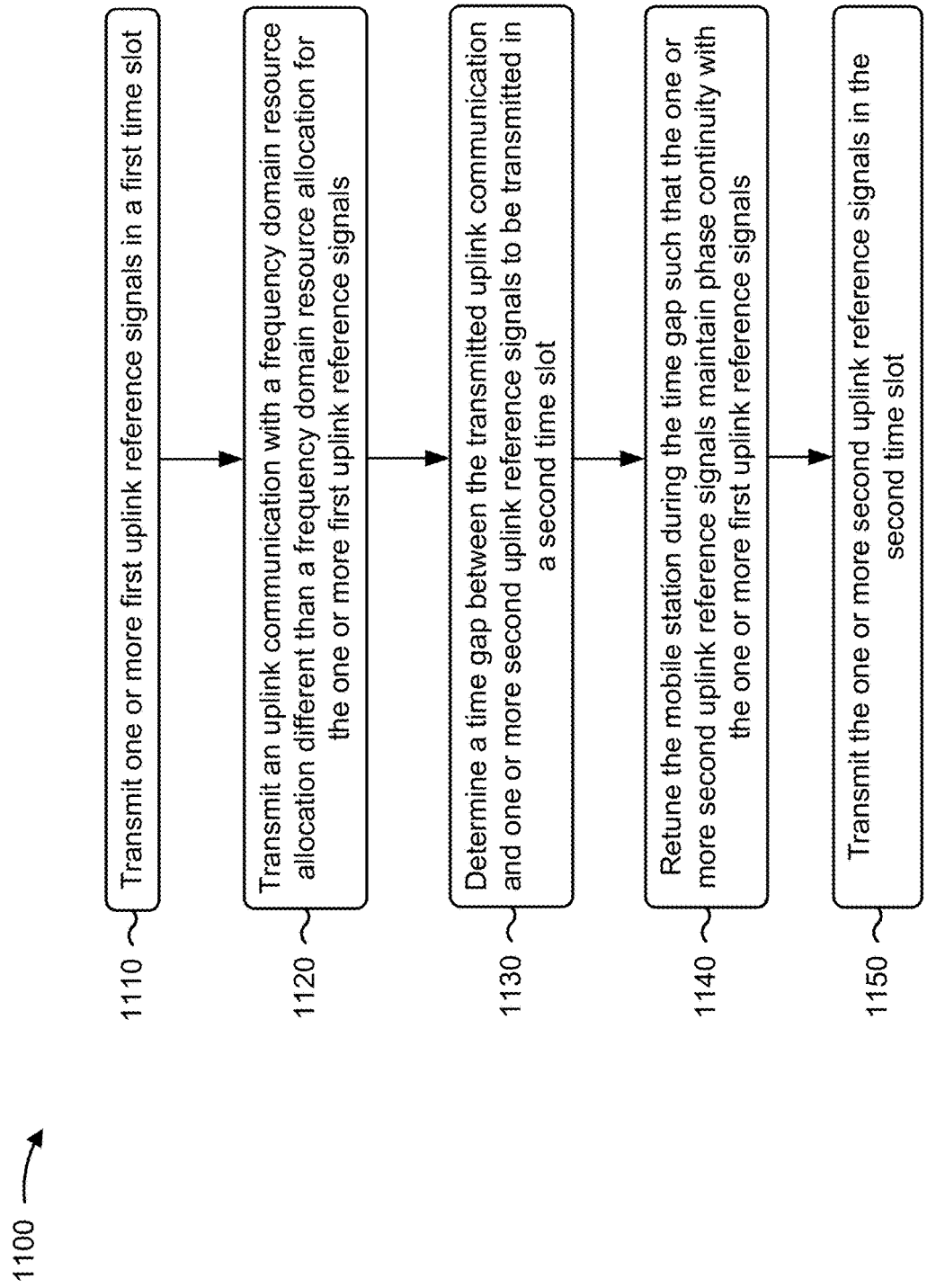
FIG. 11 is a diagram illustrating an example process performed, for example, by a mobile station, in accordance with the present disclosure.

FIG. 11 is a diagram illustrating an example process 1100 performed, for example, by a mobile station, in accordance with the present disclosure. Example process 1100 is an example where the mobile station (e.g., UE 120 depicted in FIGS. 1-2, UE 820 depicted in FIG. 8) performs operations associated with supporting cross-slot channel estimation of uplink reference signals.

As shown in FIG. 11, in some aspects, process 1100 may include transmitting one or more first uplink reference signals in a first time slot (block 1110). For example, the mobile station (e.g., using transmission component 1504 depicted in FIG. 15) may transmit one or more first uplink reference signals in a first time slot, as described above.

As further shown in FIG. 11, in some aspects, process 1100 may include transmitting an uplink communication with a frequency domain resource allocation different than a frequency domain resource allocation for the one or more first uplink reference signals (block 1120). For example, the mobile station (e.g., using transmission component 1504 depicted in FIG. 15) may transmit an uplink communication with a frequency domain resource allocation different than a frequency domain resource allocation for the one or more first uplink reference signals, as described above.

As further shown in FIG. 11, in some aspects, process 1100 may include determining a time gap between the transmitted uplink communication and one or more second uplink reference signals to be transmitted in a second time slot (block 1130). For example, the mobile station (e.g., using determination component 1508 depicted in FIG. 15) may determine a time gap between the transmitted uplink communication and one or more second uplink reference signals to be transmitted in a second time slot, as described above.

As further shown in FIG. 11, in some aspects, process 1100 may include retuning the mobile station during the time gap such that the one or more second uplink reference signals maintain phase continuity with the one or more first uplink reference signals (block 1140). For example, the mobile station (e.g., using tuning component 1510 depicted in FIG. 15) may retune the mobile station during the time gap such that the one or more second uplink reference signals maintain phase continuity with the one or more first uplink reference signals, as described above.

As further shown in FIG. 11, in some aspects, process 1100 may include transmitting the one or more second uplink reference signals in the second time slot (block 1150). For example, the mobile station (e.g., using transmission component 1504 depicted in FIG. 15) may transmit the one or more second uplink reference signals in the second time slot, as described above. In some aspects, the first time slot and the second time slot are consecutive time slots for uplink reference signals. In some aspects, there may be one or more time slots in between the first time slot and the second time slot. That is, the uplink communication may be transmitted before the time gap and before the second time slot, which is the next consecutive time slot for uplink reference signals.

Process 1100 may include additional aspects, such as any single aspect or any combination of aspects described below and/or in connection with one or more other processes described elsewhere herein.

In a first aspect, the one or more first uplink reference signals and the one or more second uplink reference signals comprise DMRSs of a PUSCH, and the uplink communication comprises one or more of an SRS, a PRACH, or a PUCCH (e.g., DMRSs of the PUCCH).

In a second aspect, alone or in combination with the first aspect, the one or more first uplink reference signals and the one or more second uplink reference signals comprise DMRSs of a PUCCH, and the uplink communication comprises one or more of an SRS, a PRACH, or a PUSCH.

In a third aspect, alone or in combination with one or more of the first and second aspects, the one or more first uplink reference signals and the one or more second uplink reference signals comprise SRSs, and the uplink communication comprises one or more of a PRACH, DMRSs of a PUSCH, or a PUCCH.

In a fourth aspect, alone or in combination with one or more of the first through third aspects, process 1100 includes determining a duration of the time gap based at least in part on an SCS of the one or more first uplink signals, an SCS of an active uplink bandwidth part for transmitting the one or more first uplink signals, an SCS of the uplink communication, or a fixed SCS indicated by stored configuration information.

In a fifth aspect, alone or in combination with one or more of the first through fourth aspects, process 1100 includes determining a number of symbols for a duration of the time gap from an indication in stored configuration information.

In a sixth aspect, alone or in combination with one or more of the first through fifth aspects, process 1100 includes reporting a mobile station capability indicating a supported number of symbols in the time gap.

In a seventh aspect, alone or in combination with one or more of the first through sixth aspects, the reported mobile station capability is indicated per frequency band.

In an eighth aspect, alone or in combination with one or more of the first through seventh aspects, the time gap is located at an end of the uplink communication or an end of the second time slot.

In a ninth aspect, alone or in combination with one or more of the first through eighth aspects, the time gap is located at a start of the second time slot.

In a tenth aspect, alone or in combination with one or more of the first through ninth aspects, the time gap extends across an end of the first time slot and a start of the second time slot or across an end of the uplink communication and the start of the second time slot.

In an eleventh aspect, alone or in combination with one or more of the first through tenth aspects, process 1100 includes receiving, from a base station, an indication that the mobile station is to schedule the time gap.

In an eleventh aspect, alone or in combination with one or more of the first through tenth aspects, the indication is signaled in system information or in a radio resource control message.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
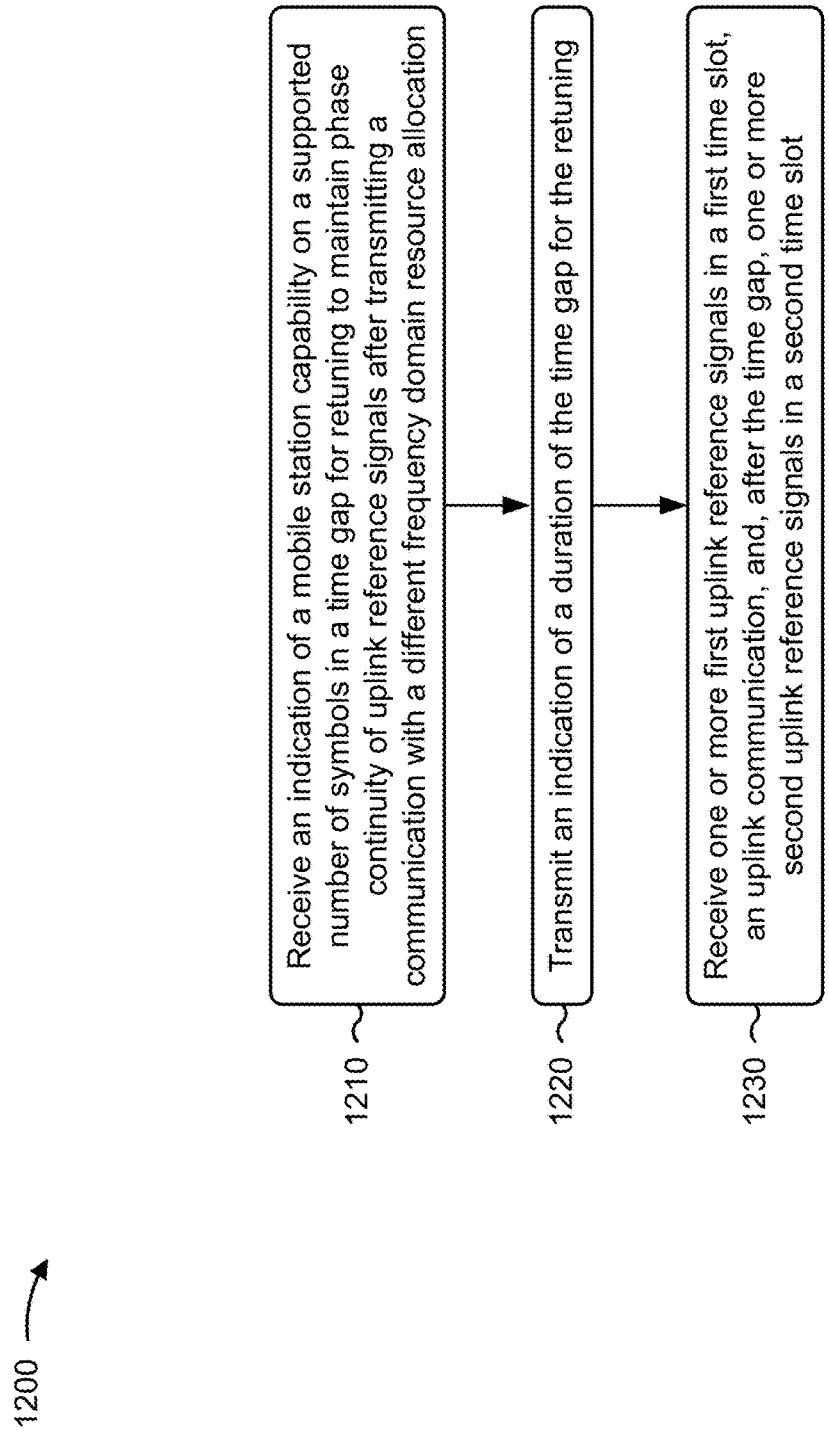
FIG. 12 is a diagram illustrating an example process performed, for example, by a base station, in accordance with the present disclosure.

FIG. 12 is a diagram illustrating an example process 1200 performed, for example, by a base station, in accordance with the present disclosure. Example process 1200 is an example where the base station (e.g., base station 110 depicted in FIGS. 1-2, BS 810 depicted in FIG. 8) performs operations associated with supporting cross-slot channel estimation of uplink reference signals.

As shown in FIG. 12, in some aspects, process 1200 may include receiving an indication of a mobile station capability on a supported number of symbols in a time gap for retuning to maintain phase continuity of uplink reference signals after transmitting a communication with a different frequency domain resource allocation (block 1210). For example, the base station (e.g., using reception component 1602 depicted in FIG. 16) may receive an indication of a mobile station capability on a supported number of symbols in a time gap for retuning to maintain phase continuity of uplink reference signals after transmitting a communication with a different frequency domain resource allocation, as described above.

As further shown in FIG. 12, in some aspects, process 1200 may include transmitting, from the base station to the mobile station, an indication of a duration of the time gap for the retuning (block 1220). For example, the base station (e.g., using transmission component 1604 depicted in FIG. 16) may transmit, from the base station to the mobile station, an indication of a duration of the time gap for the retuning, as described above.

As further shown in FIG. 12, in some aspects, process 1200 may include receiving one or more first uplink reference signals in a first time slot, an uplink communication, and, after the time gap, one or more second uplink reference signals in a second time slot (block 1230). For example, the base station (e.g., using reception component 1602 depicted in FIG. 16) may receive one or more first uplink reference signals in a first time slot, an uplink communication, and, after the time gap, one or more second uplink reference signals in a second time slot, as described above. In some aspects, the first time slot and the second time slot are consecutive time slots for uplink reference signals.

Process 1200 may include additional aspects, such as any single aspect or any combination of aspects described below and/or in connection with one or more other processes described elsewhere herein.

In a first aspect, the one or more first uplink reference signals and the one or more second uplink reference signals comprise DMRSs of a PUSCH, and the uplink communication comprises one or more of an SRS, a PRACH, or a PUCCH.

In a second aspect, alone or in combination with the first aspect, the one or more first uplink reference signals and the one or more second uplink reference signals comprise DMRSs of a PUCCH, and the uplink communication comprises one or more of an SRS, a PRACH, or a PUSCH.

In a third aspect, alone or in combination with one or more of the first and second aspects, the one or more first uplink reference signals and the one or more second uplink reference signals comprise SRSs, and the uplink communication comprises one or more of a PRACH, a PUSCH, or a PUCCH.

In a fourth aspect, alone or in combination with one or more of the first through third aspects, the indication of the number of symbols for the time gap is transmitted in system information or in a radio resource control message.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
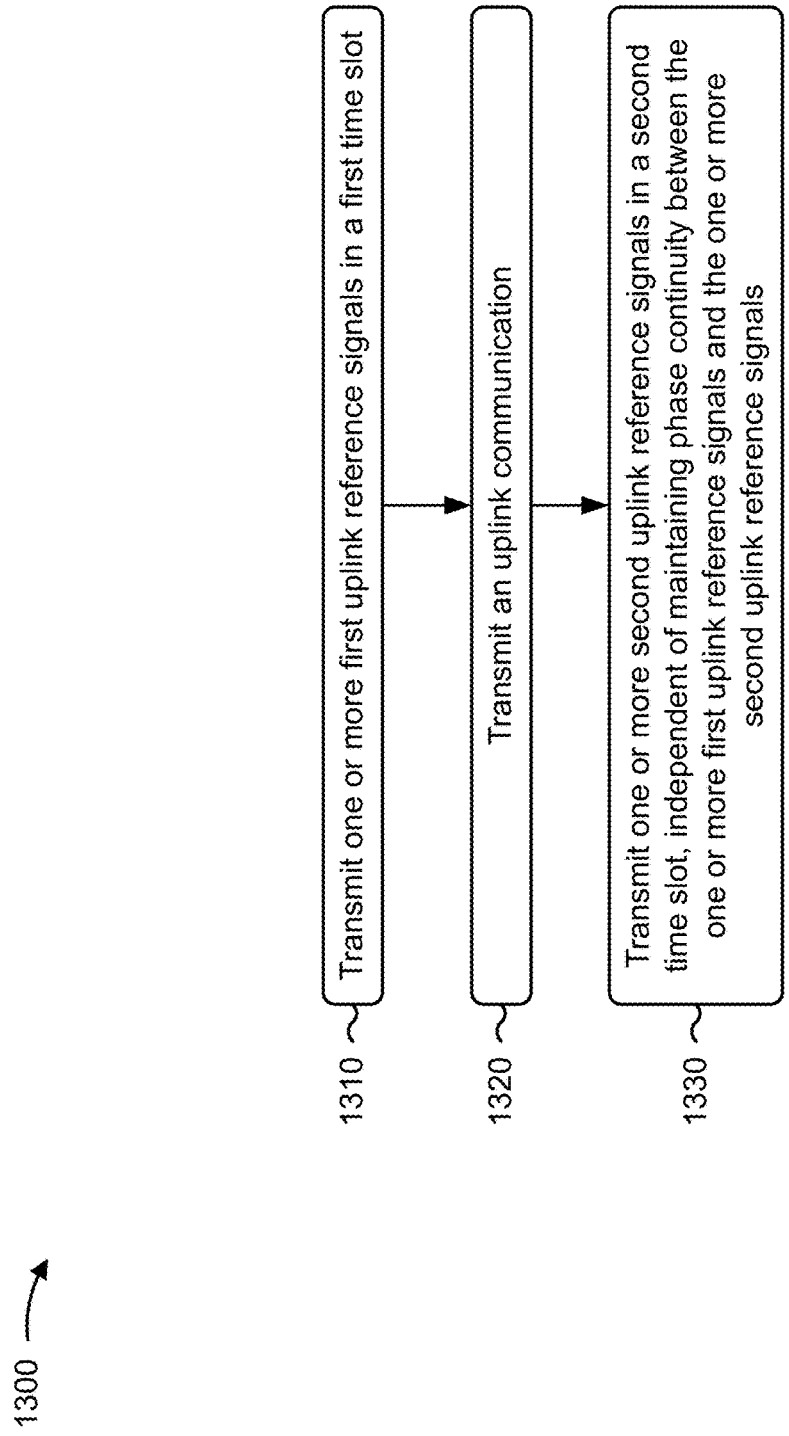
FIG. 13 is a diagram illustrating an example process performed, for example, by a mobile station, in accordance with the present disclosure.

FIG. 13 is a diagram illustrating an example process 1300 performed, for example, by a mobile station, in accordance with the present disclosure. Example process 1300 is an example where the mobile station (e.g., UE 120 depicted in FIGS. 1-2, UE 820 depicted in FIG. 8) performs operations associated with supporting cross-slot channel estimation of uplink reference signals.

As shown in FIG. 13, in some aspects, process 1300 may include transmitting one or more first uplink reference signals in a first time slot (block 1310). For example, the mobile station (e.g., using transmission component 1704 depicted in FIG. 17) may transmit one or more first uplink reference signals in a first time slot, as described above.

As further shown in FIG. 13, in some aspects, process 1300 may include transmitting an uplink communication (block 1320). For example, the mobile station (e.g., using transmission component 1704 depicted in FIG. 17) may transmit an uplink communication, as described above.

As further shown in FIG. 13, in some aspects, process 1300 may include transmitting one or more second uplink reference signals in a second time slot, where the transmitting is independent of maintaining phase continuity between the one or more first uplink reference signals and the one or more second uplink reference signals, based at least in part on a frequency domain resource allocation of the uplink communication being different than a frequency domain resource allocation for the one or more first uplink reference signals (block 1330). For example, the mobile station (e.g., using transmission component 1704 depicted in FIG. 17) may transmit one or more second uplink reference signals in a second time slot, where the transmitting is independent of maintaining phase continuity between the one or more first uplink reference signals and the one or more second uplink reference signals, based at least in part on a frequency domain resource allocation of the uplink communication being different than a frequency domain resource allocation for the one or more first uplink reference signals, as described above. In some aspects, the uplink communication is transmitted in a second time slot and the one or more second uplink reference signals are transmitted in a third time slot.

Process 1300 may include additional aspects, such as any single aspect or any combination of aspects described below and/or in connection with one or more other processes described elsewhere herein.

In a first aspect, the one or more first uplink reference signals and the one or more second uplink reference signals comprise DMRSs of a PUSCH, and the uplink communication comprises one or more of an SRS, a PRACH, or a PUCCH.

In a second aspect, alone or in combination with the first aspect, the one or more first uplink reference signals and the one or more second uplink reference signals comprise DMRSs of a PUCCH, and the uplink communication comprises one or more of an SRS, a PRACH, or a PUSCH.

In a third aspect, alone or in combination with one or more of the first and second aspects, the one or more first uplink reference signals and the one or more second uplink reference signals comprise SRSs, and the uplink communication comprises one or more of a PRACH, a PUSCH, or a PUCCH.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
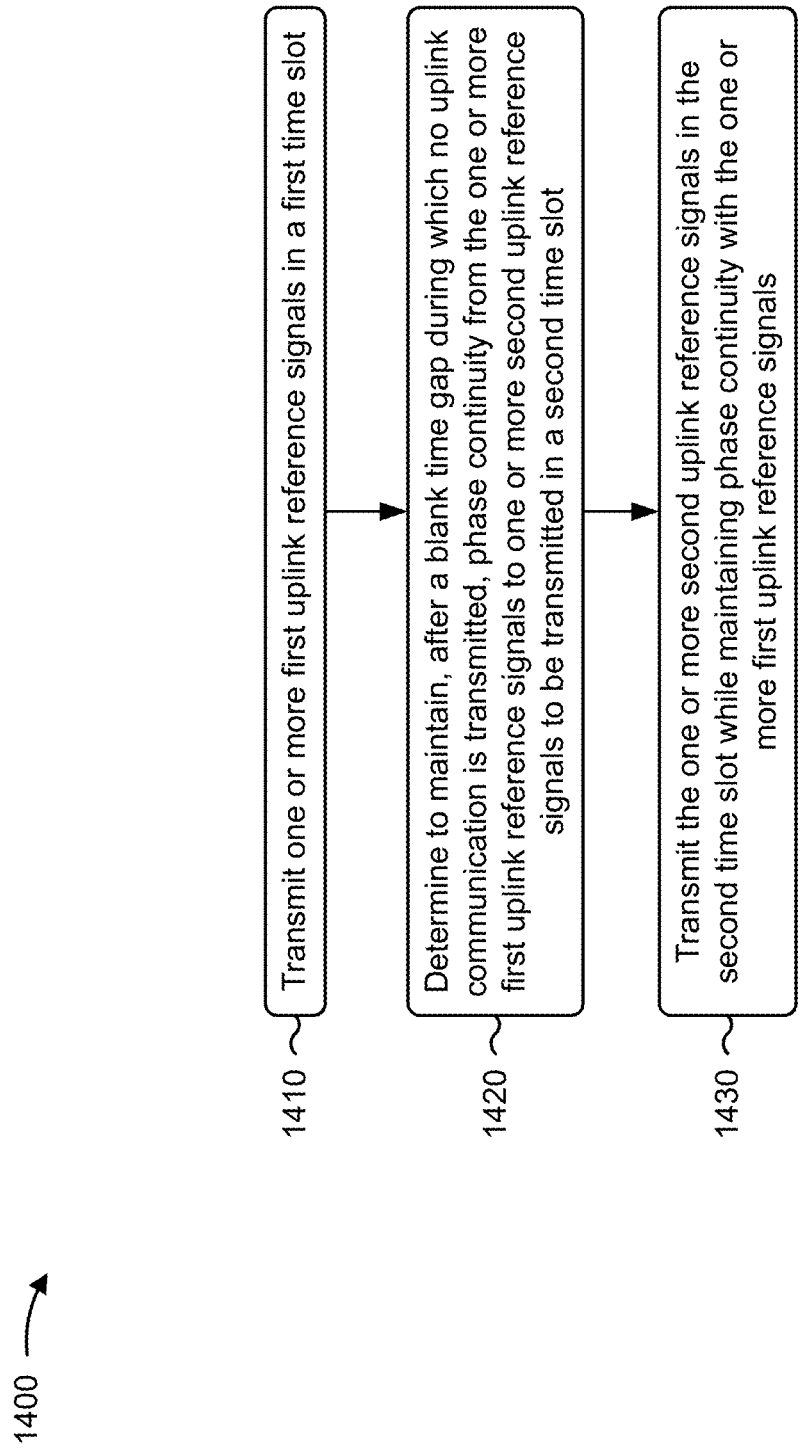
FIG. 14 is a diagram illustrating an example process performed, for example, by a mobile station, in accordance with the present disclosure.

FIG. 14 is a diagram illustrating an example process 1400 performed, for example, by a mobile station, in accordance with the present disclosure. Example process 1400 is an example where the mobile station (e.g., UE 120 depicted in FIGS. 1-2, UE 1020 depicted in FIG. 10) performs operations associated with supporting cross-slot channel estimation of uplink reference signals.

As shown in FIG. 14, in some aspects, process 1400 may include transmitting one or more first uplink reference signals in a first time slot (block 1410). For example, the mobile station (e.g., using transmission component 1804 depicted in FIG. 18) may transmit one or more first uplink reference signals in a first time slot, as described above.

As further shown in FIG. 14, in some aspects, process 1400 may include determining to maintain, after a blank time gap during which no uplink communication is transmitted, phase continuity from the one or more first uplink reference signals to one or more second uplink reference signals to be transmitted in a second time slot, based at least in part on a result of comparing the blank time gap and a blank time gap threshold (block 1420). For example, the mobile station (e.g., using determination component 1808 depicted in FIG. 18) may determine to maintain, after a blank time gap during which no uplink communication is transmitted, phase continuity from the one or more first uplink reference signals to one or more second uplink reference signals to be transmitted in a second time slot, based at least in part on a result of comparing the blank time gap and a blank time gap threshold, as described above.

As further shown in FIG. 14, in some aspects, process 1400 may include transmitting the one or more second uplink reference signals in the second time slot (block 1430). For example, the mobile station (e.g., using transmission component 1804 depicted in FIG. 18) may transmit the one or more second uplink reference signals in the second time slot, as described above.

Process 1400 may include additional aspects, such as any single aspect or any combination of aspects described below and/or in connection with one or more other processes described elsewhere herein.

In a first aspect, the one or more first uplink reference signals and the one or more second uplink reference signals comprise DMRSs of a PUSCH.

In a second aspect, alone or in combination with the first aspect, the one or more first uplink reference signals and the one or more second uplink reference signals comprise DMRSs of a PUCCH.

In a third aspect, alone or in combination with one or more of the first and second aspects, the one or more first uplink reference signals and the one or more second uplink reference signals comprise SRSs.

In a fourth aspect, alone or in combination with one or more of the first through third aspects, process 1400 includes determining a duration of the blank time gap based at least in part on an SCS of the one or more first uplink signals, an SCS of an active uplink bandwidth part for transmitting the one or more first uplink signals, or a fixed SCS indicated by stored configuration information.

In a fifth aspect, alone or in combination with one or more of the first through fourth aspects, process 1400 includes determining a number of symbols for a duration of the blank time gap from an indication in stored configuration information.

In a sixth aspect, alone or in combination with one or more of the first through fifth aspects, process 1400 includes determining a duration of the blank time gap based at least in part on a reported mobile station capability for maintaining phase continuity between consecutive time slots of uplink reference signals across a blank time gap.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
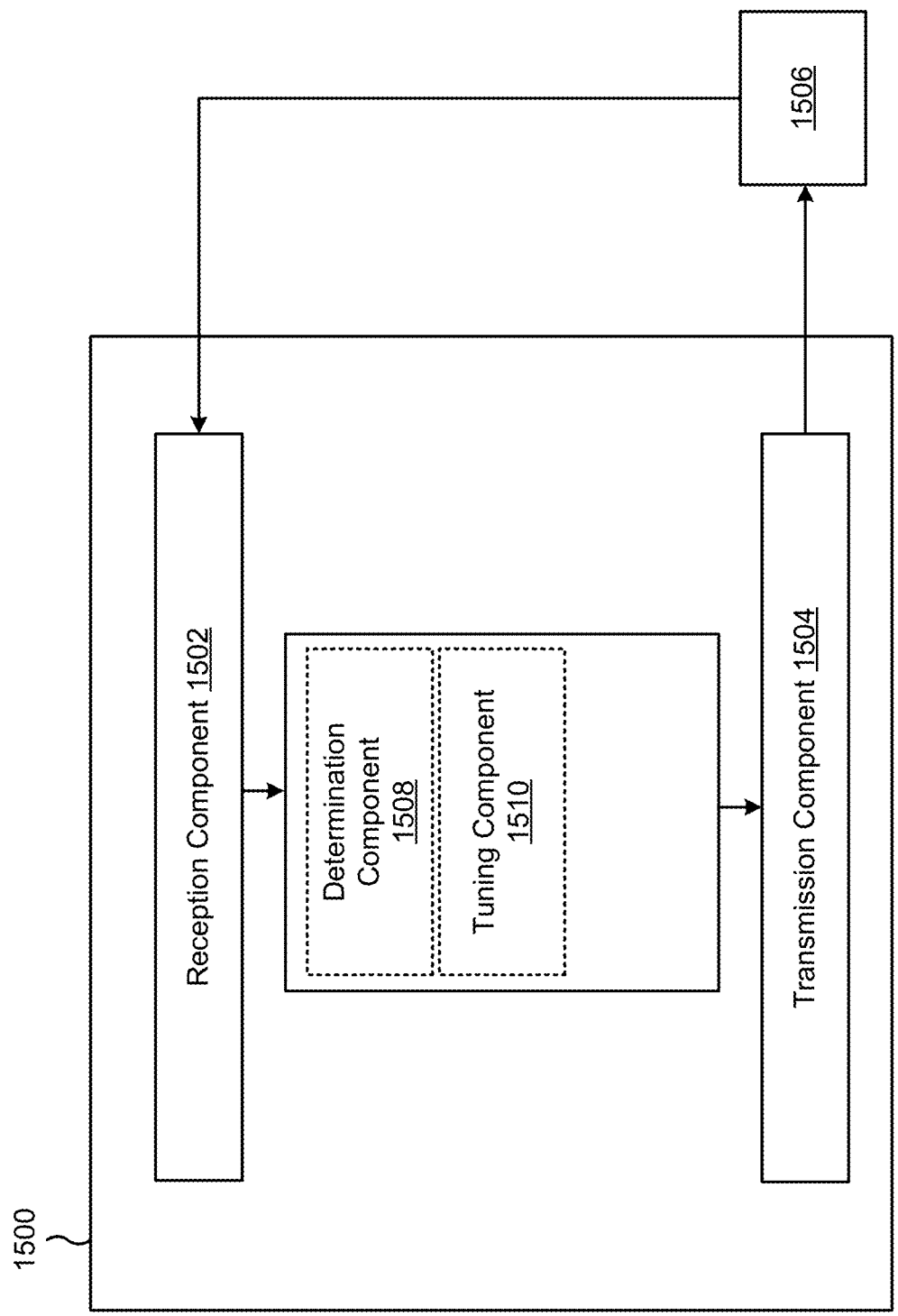
FIGS. 15-18 are block diagrams of example apparatuses for wireless communication, in accordance with the present disclosure.

FIG. 15 is a block diagram of an example apparatus 1500 for wireless communication. The apparatus 1500 may be a mobile station, such as a UE (e.g., a UE 120), or a mobile station may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a mobile station, a base station, or another wireless communication device) using the reception component 1502 and the transmission component 1504. As further shown, the apparatus 1500 may include a determination component 1508 and/or a tuning component 1510, among other examples.

In some aspects, the apparatus 1500 may be configured to perform one or more operations described herein in connection with FIGS. 1-10. Additionally, or alternatively, the apparatus 1500 may be configured to perform one or more processes described herein, such as process 1100 of FIG. 11. In some aspects, the apparatus 1500 and/or one or more components shown in FIG. 15 may include one or more components of the UE described above in connection with FIG. 2. Additionally, or alternatively, one or more components shown in FIG. 15 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a demodulator, a MIMO detector, a receive processor, a controller/processor, a memory, or a combination thereof, of the UE described above in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the UE described above in connection with FIG. 2. In some aspects, the transmission component 1504 may be co-located with the reception component 1502 in a transceiver.

The transmission component 1504 may transmit one or more first uplink reference signals in a first time slot. The transmission component 1504 may transmit an uplink communication with a frequency domain resource allocation different than a frequency domain resource allocation for the one or more first uplink reference signals.

The determination component 1508 may determine a time gap between the transmitted uplink communication and one or more second uplink reference signals to be transmitted in a second time slot. The tuning component 1510 may retune the mobile station during the time gap such that the one or more second uplink reference signals maintain phase continuity with the one or more first uplink reference signals. The transmission component 1504 may transmit the one or more second uplink reference signals in the second time slot, where the first time slot and the second time slot are consecutive time slots for uplink reference signals.

The determination component 1508 may determine a duration of the time gap based at least in part on an SCS of the one or more first uplink signals, an SCS of an active uplink bandwidth part for transmitting the one or more first uplink signals, an SCS of the uplink communication, or a fixed SCS indicated by stored configuration information.

The determination component 1508 may determine a number of symbols for a duration of the time gap from an indication in stored configuration information. The determination component 1508 may determine a duration of the time gap based at least in part on a reported mobile station capability. The transmission component 1504 may report a mobile station capability indicating a supported number of symbols in the time gap.

The reception component 1502 may receive, from a base station, an indication that the mobile station is to schedule the time gap. The indication may be signaled in system information or in a radio resource control message.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
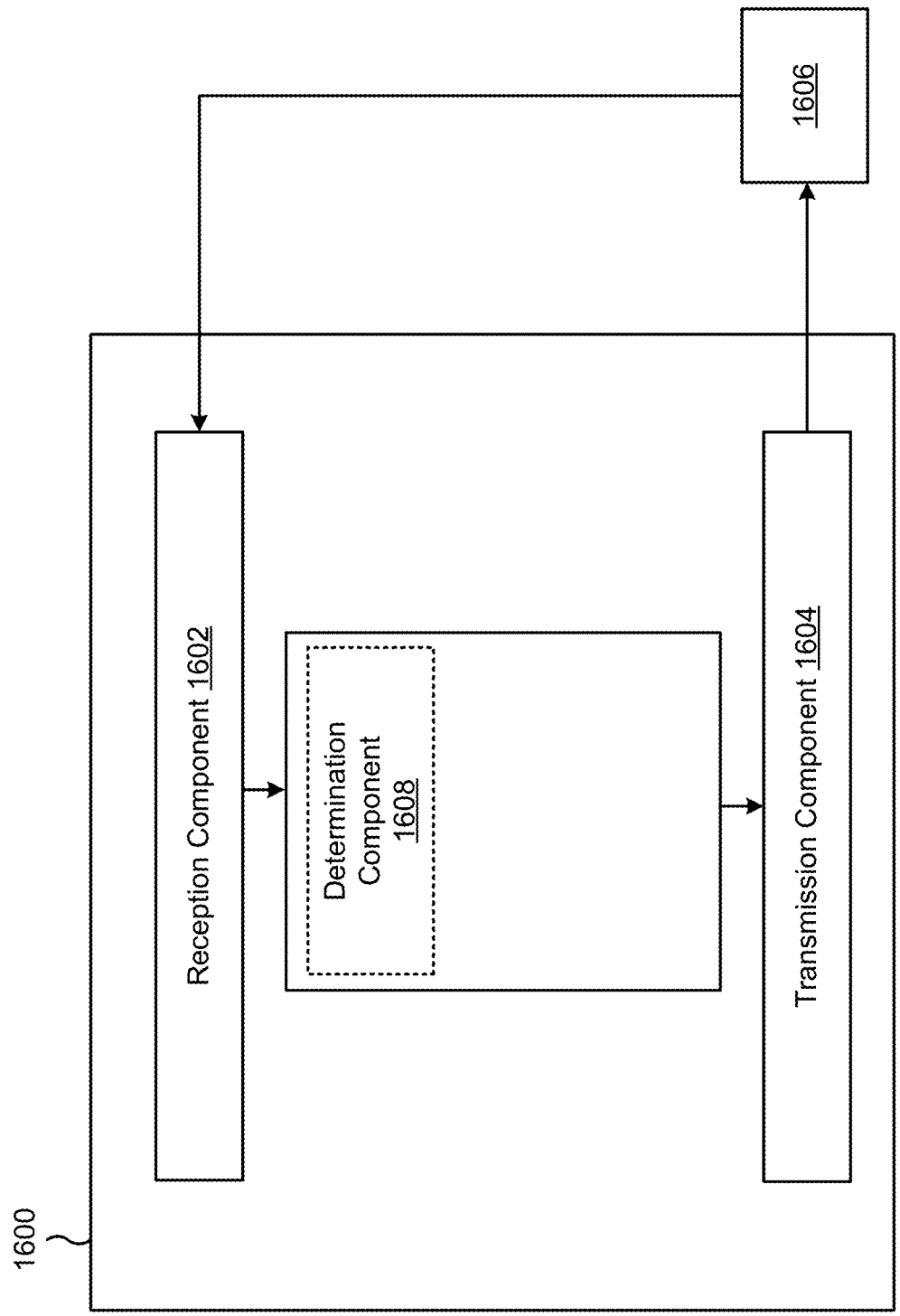

FIG. 16 is a block diagram of an example apparatus 1600 for wireless communication. The apparatus 1600 may be a base station (e.g., base station 110), or a base station may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a mobile station, a base station, or another wireless communication device) using the reception component 1602 and the transmission component 1604. As further shown, the apparatus 1600 may include a determination component 1608, among other examples.

In some aspects, the apparatus 1600 may be configured to perform one or more operations described herein in connection with FIGS. 1-10. Additionally, or alternatively, the apparatus 1600 may be configured to perform one or more processes described herein, such as process 1200 of FIG. 12. In some aspects, the apparatus 1600 and/or one or more components shown in FIG. 16 may include one or more components of the base station described above in connection with FIG. 2. Additionally, or alternatively, one or more components shown in FIG. 16 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a demodulator, a MIMO detector, a receive processor, a controller/processor, a memory, or a combination thereof, of the base station described above in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the base station described above in connection with FIG. 2. In some aspects, the transmission component 1604 may be co-located with the reception component 1602 in a transceiver.

The reception component 1602 may receive an indication of a mobile station capability on a supported number of symbols in a time gap for retuning to maintain phase continuity of uplink reference signals after transmitting a communication with a different frequency domain resource allocation. The determination component 1608 may determine a duration of a time gap for mobile station retuning based at least in part on the received indication and generate an indication or scheduling information that indicates the duration of the time gap for retuning. The transmission component 1604 may transmit, from the base station to the mobile station, the scheduling information. The reception component 1602 may receive one or more first uplink reference signals in a first time slot, an uplink communication, and, after the time gap, one or more second uplink reference signals in a second time slot, wherein the first time slot and the second time slot are consecutive time slots for uplink reference signals.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
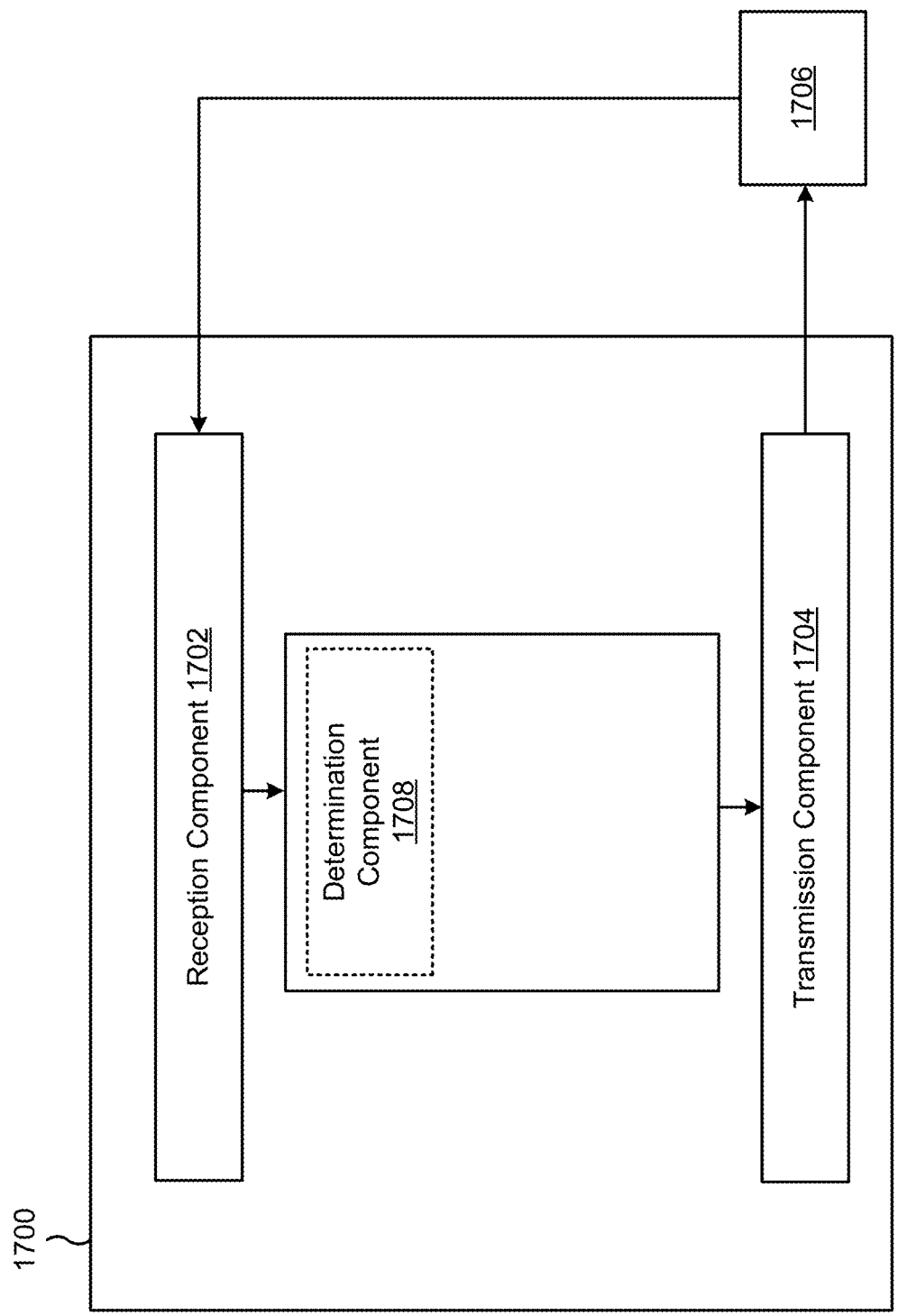

FIG. 17 is a block diagram of an example apparatus 1700 for wireless communication. The apparatus 1700 may be a mobile station, such as a UE (e.g., a UE 120), or a mobile station may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a mobile station, a base station, or another wireless communication device) using the reception component 1702 and the transmission component 1704. As further shown, the apparatus 1700 may include a determination component 1708, among other examples.

In some aspects, the apparatus 1700 may be configured to perform one or more operations described herein in connection with FIGS. 1-10. Additionally, or alternatively, the apparatus 1700 may be configured to perform one or more processes described herein, such as process 1300 of FIG. 13. In some aspects, the apparatus 1700 and/or one or more components shown in FIG. 17 may include one or more components of the UE described above in connection with FIG. 2. Additionally, or alternatively, one or more components shown in FIG. 17 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a demodulator, a MIMO detector, a receive processor, a controller/processor, a memory, or a combination thereof, of the UE described above in connection with FIG. 2.

The transmission component 1704 may transmit communications, such as reference signals, control information, data communications, or a combination thereof, to the apparatus 1706. In some aspects, one or more other components of the apparatus 1700 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modulator, a transmit MIMO processor, a transmit processor, a controller/processor, a memory, or a combination thereof, of the UE described above in connection with FIG. 2. In some aspects, the transmission component 1704 may be co-located with the reception component 1702 in a transceiver.

The transmission component 1704 may transmit one or more first uplink reference signals in a first time slot. The transmission component 1704 may transmit an uplink communication. The determination component 1708 may determine that the mobile station is not expected to maintain phase continuity between the one or more first uplink reference signals and the one or more second uplink reference signals, based at least in part on a frequency domain resource allocation of the uplink communication being different than a frequency domain resource allocation for the one or more first uplink reference signals. The transmission component 1704 may transmit one or more second uplink reference signals in a second time slot, where the transmitting is independent of maintaining phase continuity.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

Figure 18:
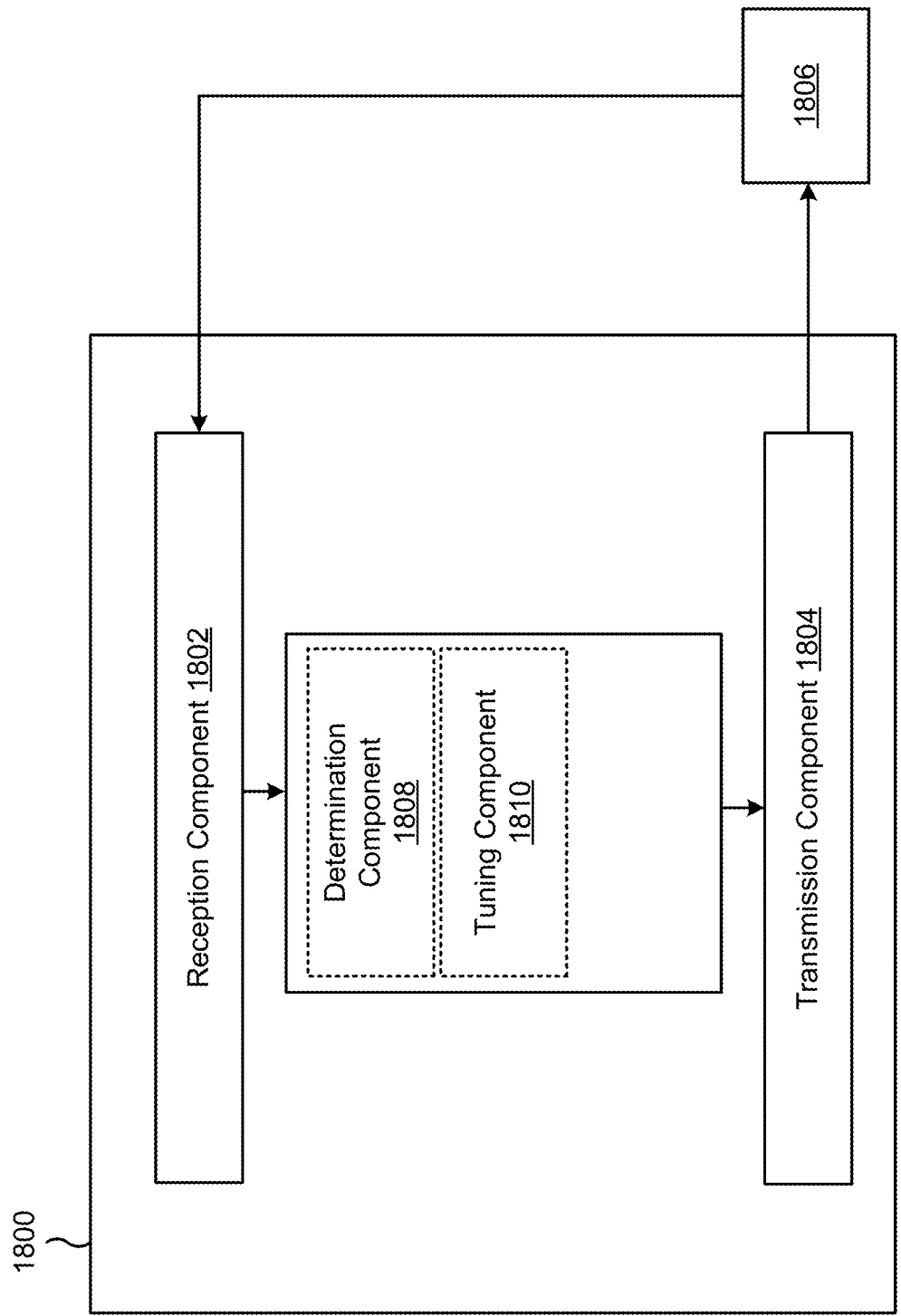

FIG. 18 is a block diagram of an example apparatus 1800 for wireless communication. The apparatus 1800 may be mobile station, such as a UE (e.g., UE 120), or a mobile station may include the apparatus 1800. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a mobile station, a base station, or another wireless communication device) using the reception component 1802 and the transmission component 1804. As further shown, the apparatus 1800 may a determination component 1808 and/or a tuning component 1810, among other examples.

In some aspects, the apparatus 1800 may be configured to perform one or more operations described herein in connection with FIGS. 1-10. Additionally, or alternatively, the apparatus 1800 may be configured to perform one or more processes described herein, such as process 1400 of FIG. 14. In some aspects, the apparatus 1800 and/or one or more components shown in FIG. 18 may include one or more components of the UE described above in connection with FIG. 2. Additionally, or alternatively, one or more components shown in FIG. 18 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1800. In some aspects, the reception component 1802 may include one or more antennas, a demodulator, a MIMO detector, a receive processor, a controller/processor, a memory, or a combination thereof, of the UE described above in connection with FIG. 2.

The transmission component 1804 may transmit communications, such as reference signals, control information, data communications, or a combination thereof, to the apparatus 1806. In some aspects, one or more other components of the apparatus 1800 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modulator, a transmit MIMO processor, a transmit processor, a controller/processor, a memory, or a combination thereof, of the UE described above in connection with FIG. 2. In some aspects, the transmission component 1804 may be co-located with the reception component 1802 in a transceiver.

The transmission component 1804 may transmit one or more first uplink reference signals in a first time slot. The determination component 1808 may determine to maintain, after a blank time gap during which no uplink communication is transmitted, phase continuity from the one or more first uplink reference signals to one or more second uplink reference signals to be transmitted in a second time slot, based at least in part on a result of comparing the blank time gap and a blank time gap threshold. The tuning component 1810 may maintain or adjust a phase for uplink reference signals so as to maintain phase continuity. The transmission component 1804 may transmit the one or more second uplink reference signals in the second time slot.

The determination component 1808 may determine a duration of the blank time gap based at least in part on an SCS of the one or more first uplink signals, an SCS of an active uplink bandwidth part for transmitting the one or more first uplink signals, or a fixed SCS indicated by stored configuration information.

The determination component 1808 may determine a number of symbols for a duration of the blank time gap from an indication in stored configuration information.

The determination component 1808 may determine a duration of the blank time gap based at least in part on a reported mobile station capability for maintaining phase continuity between consecutive time slots of uplink reference signals across a blank time gap.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

The following provides an overview of some aspects of the present disclosure:

Aspect 1: A method of wireless communication performed by a mobile station, comprising: transmitting, by the mobile station, one or more first uplink reference signals in a first time slot; transmitting, by the mobile station, an uplink communication with a frequency domain resource allocation different than a frequency domain resource allocation for the one or more first uplink reference signals; determining, by the mobile station, a time gap between the transmitted uplink communication and one or more second uplink reference signals to be transmitted in a second time slot; retuning, by the mobile station, the mobile station during the time gap such that the one or more second uplink reference signals maintain phase continuity with the one or more first uplink reference signals; and transmitting, by the mobile station, the one or more second uplink reference signals in the second time slot, wherein the first time slot and the second time slot are consecutive time slots for uplink reference signals.

Aspect 2: The method of Aspect 1, wherein the one or more first uplink reference signals and the one or more second uplink reference signals comprise demodulation reference signals (DMRSs) of a physical uplink shared channel, and wherein the uplink communication comprises one or more of a sounding reference signal, a physical random access channel, or a physical uplink control channel.

Aspect 3: The method of Aspect 1, wherein the one or more first uplink reference signals and the one or more second uplink reference signals comprise demodulation reference signals (DMRSs) of a physical uplink control channel, and wherein the uplink communication comprises one or more of a sounding reference signal, a physical random access channel, or a physical uplink shared channel.

Aspect 4: The method of Aspect 1, wherein the one or more first uplink reference signals and the one or more second uplink reference signals comprise sounding reference signals, and wherein the uplink communication comprises one or more of a physical random access channel, a physical uplink shared channel, or a physical uplink control channel.

Aspect 5: The method of any of Aspects 1-4, further comprising determining a number of symbols for a duration of the time gap from an indication in stored configuration information.

Aspect 6: The method of any of Aspects 1-5, further comprising determining a duration of the time gap based at least in part on a subcarrier spacing (SCS) of the one or more first uplink signals, an SCS of an active uplink bandwidth part for transmitting the one or more first uplink signals, an SCS of the uplink communication, or a fixed SCS indicated by stored configuration information.

Aspect 7: The method of any of Aspects 1-6, further comprising reporting a mobile station capability indicating a supported number of symbols in the time gap.

Aspect 8: The method of Aspect 7, wherein the mobile station capability is indicated per frequency band.

Aspect 9: The method of any of Aspects 1-8, wherein the time gap is located at an end of the uplink communication.

Aspect 10: The method of any of Aspects 1-8, wherein the time gap is located at a start of the second time slot.

Aspect 11: The method of any of Aspects 1-10, further comprising receiving, from a base station, an indication that the mobile station is to schedule the time gap.

Aspect 12: The method of Aspect 11, the indication is signaled in system information or in a radio resource control message.

Aspect 13: A method of wireless communication performed by a base station, comprising: receiving, by the base station from a mobile station, an indication of a mobile station capability on a supported number of symbols in a time gap for retuning to maintain phase continuity of uplink reference signals after transmitting a communication with a different frequency domain resource allocation; transmitting, from the base station to the mobile station, an indication of a duration of the time gap for the retuning; and receiving, by the base station, one or more first uplink reference signals in a first time slot, an uplink communication, and, after the time gap, one or more second uplink reference signals in a second time slot, wherein the first time slot and the second time slot are consecutive time slots for uplink reference signals.

Aspect 14: The method of Aspect 13, wherein the one or more first uplink reference signals and the one or more second uplink reference signals comprise demodulation reference signals (DMRSs) of a physical uplink shared channel, and wherein the uplink communication comprises one or more of a sounding reference signal, a physical random access channel, or a physical uplink control channel.

Aspect 15: The method of Aspect 13, wherein the one or more first uplink reference signals and the one or more second uplink reference signals comprise demodulation reference signals (DMRSs) of a physical uplink control channel, and wherein the uplink communication comprises one or more of a sounding reference signal, a physical random access channel, or a physical uplink shared channel.

Aspect 16: The method of Aspect 13, wherein the one or more first uplink reference signals and the one or more second uplink reference signals comprise sounding reference signals, and wherein the uplink communication comprises one or more of a physical random access channel, a physical uplink shared channel, or a physical uplink control channel.

Aspect 17: The method of any of Aspects 13-16, wherein the indication of a number of symbols for the time gap is transmitted in system information or in a radio resource control message.

Aspect 18: A method of wireless communication performed by a mobile station, comprising: transmitting, by the mobile station, one or more first uplink reference signals in a first time slot; transmitting, by the mobile station, an uplink communication; and transmitting, by the mobile station, one or more second uplink reference signals in a second time slot, wherein the transmitting is independent of maintaining phase continuity between the one or more first uplink reference signals and the one or more second uplink reference signals, based at least in part on a frequency domain resource allocation of the uplink communication being different than a frequency domain resource allocation for the one or more first uplink reference signals.

Aspect 19: The method of Aspect 18, wherein the one or more first uplink reference signals and the one or more second uplink reference signals comprise demodulation reference signals (DMRSs) of a physical uplink shared channel, and wherein the uplink communication comprises one or more of a sounding reference signal, a physical random access channel, or a physical uplink control channel.

Aspect 20: The method of Aspect 18, wherein the one or more first uplink reference signals and the one or more second uplink reference signals comprise demodulation reference signals (DMRSs) of a physical uplink control channel, and wherein the uplink communication comprises one or more of a sounding reference signal, a physical random access channel, or a physical uplink shared channel.

Aspect 21: The method of Aspect 18, wherein the one or more first uplink reference signals and the one or more second uplink reference signals comprise sounding reference signals, and wherein the uplink communication comprises one or more of a physical random access channel, a physical uplink shared channel, or a physical uplink control channel.

Aspect 22: A method of wireless communication performed by a mobile station, comprising: transmitting, by the mobile station, one or more first uplink reference signals in a first time slot; determining, by the mobile station, to maintain, after a blank time gap during which no uplink communication is transmitted, phase continuity from the one or more first uplink reference signals to one or more second uplink reference signals to be transmitted in a second time slot, based at least in part on a result of comparing the blank time gap and a blank time gap threshold; and transmitting, by the mobile station while maintaining phase continuity with the one or more first uplink reference signals, the one or more second uplink reference signals in the second time slot.

Aspect 23: The method of Aspect 22, wherein the one or more first uplink reference signals and the one or more second uplink reference signals comprise demodulation reference signals (DMRSs) of a physical uplink shared channel.

Aspect 24: The method of Aspect 22, wherein the one or more first uplink reference signals and the one or more second uplink reference signals comprise demodulation reference signals (DMRSs) of a physical uplink control channel.

Aspect 25: The method of Aspect 22, wherein the one or more first uplink reference signals and the one or more second uplink reference signals comprise sounding reference signals.

Aspect 26: The method of any of Aspects 22-25, further comprising determining a number of symbols for a duration of the blank time gap from an indication in stored configuration information.

Aspect 27: The method of any of Aspects 22-26, further comprising determining a duration of the blank time gap based at least in part on a subcarrier spacing (SCS) of the one or more first uplink signals, an SCS of an active uplink bandwidth part for transmitting the one or more first uplink signals, or a fixed SCS indicated by stored configuration information.

Aspect 28: The method of any of Aspects 22-27, further comprising determining a duration of the blank time gap based at least in part on a reported mobile station capability for maintaining phase continuity between consecutive time slots of uplink reference signals across a blank time gap.

Aspect 29: An apparatus for wireless communication at a device, comprising a processor; memory coupled with the processor; and instructions stored in the memory and executable by the processor to cause the apparatus to perform the method of one or more of Aspects 1-28.

Aspect 30: A device for wireless communication, comprising a memory and one or more processors coupled to the memory, the memory and the one or more processors configured to perform the method of one or more of Aspects 1-28.

Aspect 31: An apparatus for wireless communication, comprising at least one means for performing the method of one or more of Aspects 1-28.

Aspect 32: A non-transitory computer-readable medium storing code for wireless communication, the code comprising instructions executable by a processor to perform the method of one or more of Aspects 1-28.

Aspect 33: A non-transitory computer-readable medium storing a set of instructions for wireless communication, the set of instructions comprising one or more instructions that, when executed by one or more processors of a device, cause the device to perform the method of one or more of Aspects 1-28.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A mobile station for wireless communication, comprising:
   a memory; and
   one or more processors coupled to the memory, the one or more processors configured to:
      transmit one or more first uplink reference signals in a first time slot;
      transmit an uplink communication with a frequency domain resource allocation different than a frequency domain resource allocation for the one or more first uplink reference signals;
      determine a time gap between the transmitted uplink communication and one or more second uplink reference signals to be transmitted in a second time slot;
      retune the mobile station during the time gap such that the one or more second uplink reference signals maintain phase continuity with the one or more first uplink reference signals; and
      transmit the one or more second uplink reference signals in the second time slot, wherein the first time slot and the second time slot are consecutive time slots for uplink reference signals.

2. A mobile station for wireless communication, comprising:
   a memory; and
   one or more processors coupled to the memory, the one or more processors configured to:
      transmit one or more uplink reference signals in a first transmission in a first slot via a channel;
      transmit, subsequent to the first slot, the one or more uplink reference signals in a a second transmission in a second slot via the channel, the one ore more uplink reference signals in the first transmission and in the second transmission being in a bundle,
      wherein phase continuity of the one or more uplink reference signals in the first transmission and in the second transmission is maintained based on a time gap, the time gap comprising a gap between the first transmission and the second transmission.

3. The mobile station for wireless communication of claim 2, the one or more uplink reference signals comprising demodulation reference signals (DMRSs), wherein the phase continuity being maintained is further based on a time gap threshold.

4. The mobile station for wireless communication of claim 3, wherein phase continuity being maintained being further based on a capability reported by the mobile station.

5. The mobile station for wireless communication of claim 4, the capability being indicated per frequency band.

6. The mobile station for wireless communication of claim 3, the time gap being a number of symbols.

7. The mobile station for wireless communication of claim 3, wherein the first transmission and the second transmission are independent of maintaining phase continuity based on the first transmission and the second transmission being consecutive, and a transmission of an other uplink communication between the first transmission and the second transmission.

8. A base station for wireless communication, comprising:
   a memory; and
   one or more processors coupled to the memory, the one or more processors configured to:
      receive, from a mobile station, one or more uplink reference signals in a first transmission in a first slot via a channel;
      receive, subsequent to the first slot, the one or more uplink reference signals in a second transmission in a second slot via the channel, the one or more uplink reference signals in the first transmission and in the second transmission being in a bundle,
      wherein the one or more processors are configured to receive the one or more uplink reference signals in the first transmission and in the second transmission based on the one or more uplink reference signals maintaining phase continuity in the first transmission and in the second transmission, wherein the phase continuity being maintained is based on a time gap, and the time gap comprises a gap between the first transmission and the second transmission.

9. The base station for wireless communication of claim 8, the one or more uplink reference signals comprising demodulation reference signals (DMRSs). wherein the phase continuity being maintained is further based on a time gap threshold.

10. The base station for wireless communication of claim 9, wherein phase continuity being maintained being further based on a capability reported by the mobile station.

11. The base station for wireless communication of claim 10, the capability being indicated per frequency band.

12. The base station for wireless communication of claim 9, the time gap being a number of symbols.

13. The base station for wireless communication of claim 9, wherein the first transmission and the second transmission are independent of maintaining phase continuity based on the first transmission and the second transmission being consecutive, and a transmission of an other uplink communication between the first transmission and the second transmission.

* * * * *